(12) United States Patent
Ogasawara

(10) Patent No.: US 7,246,867 B2
(45) Date of Patent: Jul. 24, 2007

(54) INK JET RECORDING APPARATUS AND INK JET RECORDING METHOD

(75) Inventor: Fumihiko Ogasawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 405 days.

(21) Appl. No.: 10/936,695

(22) Filed: Sep. 9, 2004

(65) Prior Publication Data

US 2005/0057604 A1    Mar. 17, 2005

(30) Foreign Application Priority Data

Sep. 12, 2003   (JP)   ............... 2003-320591

(51) Int. Cl.
*B41J 2/205*   (2006.01)
(52) U.S. Cl. .................... 347/15; 358/1.9; 347/19; 347/41
(58) Field of Classification Search ............ 347/19, 347/41, 15, 43, 16, 40; 358/1.9
See application file for complete search history.

(56) References Cited

U.S. PATENT DOCUMENTS 6,116,720 A    9/2000   Inui et al. ................ 347/43
6,290,330 B1 *  9/2001   Torpey et al. ............ 347/43
6,533,393 B1 *  3/2003   Meyer et al. ............. 347/43
2003/0151642 A1 * 8/2003  Kaneko .................... 347/43

FOREIGN PATENT DOCUMENTS

| EP | 0 947 330 A1 | 10/1999 |
| JP | 6-113155 | 4/1994 |
| JP | 10-67125 | 3/1998 |
| JP | 11-77992 | 3/1999 |

* cited by examiner

*Primary Examiner*—Lamson Nguyen
(74) *Attorney, Agent, or Firm*—Morgan, Lewis & Bockius LLP

(57) ABSTRACT

An ink jet recording apparatus includes: a black print head that discharges black ink; a color print head that discharges color ink having a higher permeability with a recording paper sheet than the black ink; and a determining unit that detects, based on input data, a black image region in which recording is performed with the black ink and a color image region in which recording is performed with the color ink, and, based on the detection result, determines whether the black ink or the color ink is first applied onto the recording paper sheet. In this ink jet recording apparatus, each of the black print head and the color print head has nozzles divided into several sets, and a multi-path recording operation is performed by scanning each recording region several times with the sets of nozzles.

19 Claims, 16 Drawing Sheets

Fig. 2A
INPUT IMAGE DATA
Fig. 2B
EXAMPLE OF IMAGE CONVERTED AND INFORMATION ADDED REGION
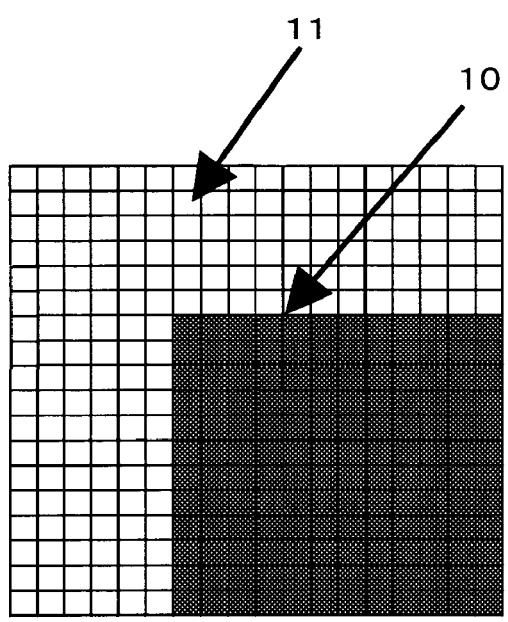
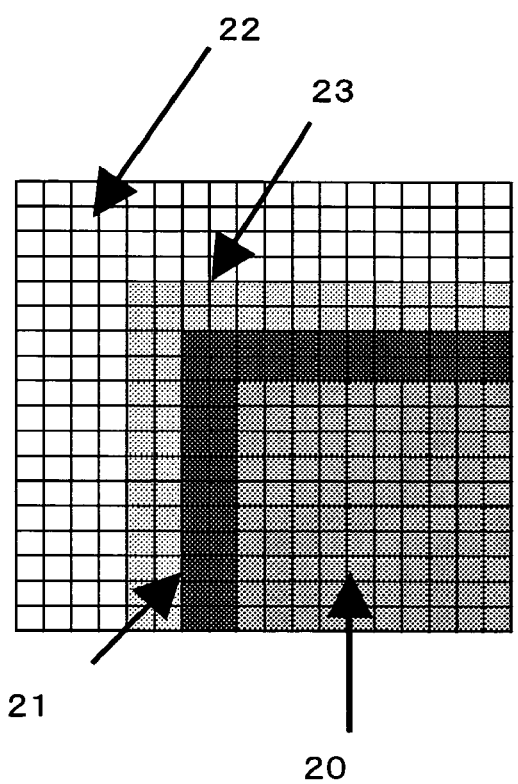

Fig. 3

| REFERENCE NUMERAL | ADDITIONAL INFORMATION | PIXEL CONVERSION | |
|---|---|---|---|
| | | BLACK | COLOR |
| 20 | BLACK INNER REGION | THINNING | ADDING |
| 21 | BLACK BOUNDARY REGION | THINNING | ADDING |
| 22 | COLOR INNER REGION | NONE (REGULAR PRINTING) | NONE (REGULAR PRINTING) |
| 23 | COLOR BOUNDARY REGION | — | THINNING |
| 24 | OTHER REGION | NONE (REGULAR PRINTING) | NONE (REGULAR PRINTING) |

INPUT IMAGE DATA

IMAGE DATA AFTER IMAGE CONVERSION

Fig. 5

| REFERENCE NUMERAL | ADDITIONAL INFORMATION | INPUT IMAGE DATA | | OUTPUT PIXEL DATA | |
|---|---|---|---|---|---|
| | | BLACK | COLOR | BLACK | COLOR |
| 20 | BLACK INNER REGION | '01' | '00' | '11' | '11' |
| 21 | BLACK BOUNDARY REGION | '01' | '00' | '10' | '00' |
| 22 | COLOR INNER REGION | '00' | '01' | '00' | '01' |
| 23 | COLOR BOUNDARY REGION | '00' | '01' | '00' | '10' |
| 24 | NONE(OTHER BLACK REGION) | '01' | '00' | '01' | '00' |
| 24 | NONE(OTHER COLOR REGION) | '00' | '01' | '00' | '01' |

Fig. 6

| 4 PRINT HEAD | BLACK INNER REGION | | BLACK BOUNDARY REGION | | COLOR BOUNDARY REGION | | COLOR INNER REGION | | OTHER REGION | | | |
|---|---|---|---|---|---|---|---|---|---|---|---|---|
| | '11' BLACK | '11' COLOR | '10' BLACK | '00' COLOR | '00' BLACK | '10' COLOR | '00' BLACK | '01' COLOR | '00' BLACK | '01' BLACK | '00' COLOR | '01' COLOR |
| Nozzle No. 1 ↑ | 0% | 100% | 100% | — | — | 0% | — | 50% | — | 50% | — | 50% |
| Nozzle No. N ↑ | 100% | 0% | 0% | — | — | 100% | — | 50% | — | 50% | — | 50% |
| Total(%) → 100% | 100% | | 100% | | 100% | | 100% | | 100% | | 100% | |

Fig. 7A
ORIGINAL IMAGE DATA
Fig. 7B
PRIOR ART
Fig. 7C
FIRST EMBODIMENT
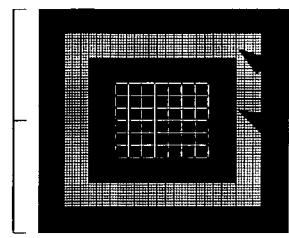
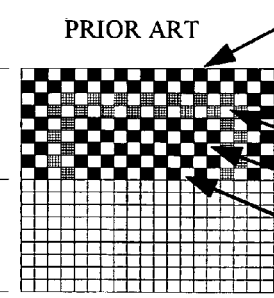
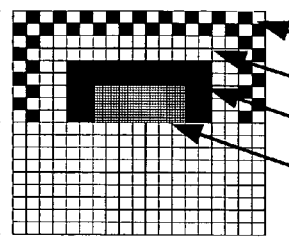
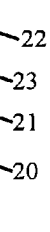
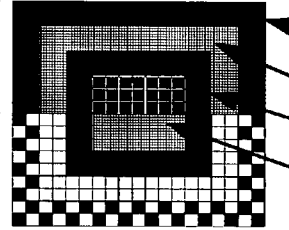
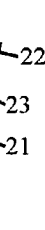

Fig. 8

| REFERENCE NUMERAL | ADDITIONAL INFORMATION | INPUT IMAGE DATA | | OUTPUT PIXEL DATA | |
|---|---|---|---|---|---|
| | | BLACK | COLOR | BLACK | COLOR |
| 20 | BLACK INNER REGION | '01' | '00' | '11' | '11' |
| 21 | BLACK BOUNDARY REGION | '01' | '00' | '10' | '00' |
| 22 | COLOR INNER REGION | '00' | '01' | '00' | '01' |
| 23 | COLOR BOUNDARY REGION | '00' | '01' | '00' | '10' |

ORIGINAL IMAGE DATA

PATH 1

PATH 2

PATH 3

PATH 4

PATH 5

PATH 6

PATH 7

FIRST EMBODIMENT

PATH 1

PATH 2

PATH 3

PATH 4

PATH 5

PATH 6

PATH 7

Fig. 11

| REFERENCE NUMERAL | ADDITIONAL INFORMATION | INPUT IMAGE DATA | | OUTPUT PIXEL DATA | |
|---|---|---|---|---|---|
| | | BLACK | COLOR | BLACK | COLOR |
| 20 | BLACK INNER REGION | '01' | '00' | '11' | '11' |
| 21 | BLACK BOUNDARY REGION | '01' | '00' | '10' | '00' |
| 22 | COLOR INNER REGION | '00' | '01' | '00' | '01' |
| 23 | COLOR BOUNDARY REGION | '00' | '01' | '00' | '10' |

ORIGINAL IMAGE DATA

PATH 1

PATH 2

PATH 3

FIRST EMBODIMENT

PATH 1

PATH 2

PATH 3

Fig.14

| REFERENCE NUMERAL | ADDITIONAL INFORMATION | INPUT IMAGE DATA | | OUTPUT PIXEL DATA | |
|---|---|---|---|---|---|
| | | BLACK | COLOR | BLACK | COLOR |
| 20 | BLACK INNER REGION | '01' | '00' | '11' | '11' |
| 21 | BLACK BOUNDARY REGION | '01' | '00' | '10' | '00' |
| 22 | COLOR INNER REGION | '00' | '01' | '00' | '01' |
| 23 | COLOR BOUNDARY REGION | '00' | '01' | '00' | '10' |

ORIGINAL IMAGE DATA

FIRST EMBODIMENT

INK JET RECORDING APPARATUS AND INK JET RECORDING METHOD

BACKGROUND OF THE INVENTION

1. Field of the invention

The present invention generally relates to an ink jet recording apparatus and an ink jet recording method.

2. Description of the Related Art

There has been a color ink jet recording technique for recording images by discharging liquid ink droplets from nozzles. Having a simple structure and reduced printing noise, this color ink jet recording technique is suitable for small-sized printers. To obtain a high-quality image without ink bleeding, however, it is necessary to use special paper sheets such as coated paper sheets each having an ink absorbing layer formed thereon. On plain paper such as copy paper, ink bleeding is easily caused in each boundary area between different colors.

To counter this problem, there has been a method for reducing ink bleeding between colors by increasing the permeability of ink with paper sheets. With this method, however, there is a problem of poor sharpness (feathering) along the edges of lines and characters printed especially with black ink.

To increase the image quality of lines and characters, there has been a technique for reducing bleeding between color inks by employing the color inks each having a higher permeability than the black ink with a low permeability. By this technique, however, ink bleeding cannot be prevented between a black ink printed region and a color ink printed region that are adjacent to each other and have different permeating rates. Conventional techniques suggested to counter this problem are as follows.

Japanese Patent Application Publication No. 6-113155 (Patent Document 1) discloses a device that converts print pixels in each boundary area between black ink regions and color ink regions in an image so as to prevent bleeding between the black ink and the color ink.

Japanese Patent Application Publication No. 10-067125 (Patent Document 2) discloses a device that sets a time interval between black ink application and color ink application onto a recording paper sheet so as to prevent ink bleeding. Japanese Patent Application Publication No. 11-077992 (Patent Document 3) discloses a device that measures the recording density based on image data, and, according to the recording density, switches recording modes for each main scan.

In a case where black ink having a low permeating rate is employed to increase the print quality with the black ink, ink transfer between printed paper sheets in a high-speed printing operation is caused due to the low fixing speed. To counter this problem, there has been a technique (Prior Art 4) of applying color ink having a higher permeability before applying black ink and utilizing a chemical reaction between black ink and color ink so as to increase the ink fixing speed.

With the device disclosed in Patent Document 1, however, excessive pixel conversion to prevent ink bleeding leads to the appearance of white lines on the boundaries between black pixels and color pixels, as the color pixels that are adjacent to the black pixels are converted into blank data. If the black pixels that are adjacent to color pixels are converted into color data, the image quality in the black image region deteriorates, as the brightness in the converted region becomes higher than the brightness of the black ink and the higher brightness results in an insufficient density. In this manner, if a very large number of pixels are converted to prevent ink bleeding, image deterioration is caused for a different reason.

With the device disclosed in Patent Document 2, there is a problem in that the actual printing speed greatly decreases, though ink bleeding can be prevented by setting a certain time interval between the black ink application and the color ink application.

With the device disclosed in Patent Document 3, there is a problem in that the recording modes are switched even for image data that cause little ink bleeding, resulting in an unnecessary decrease in printing speed.

In Prior Art 4, the color ink needs to be applied onto the paper sheet before the black ink. Therefore, printing is performed by separate scans for applying the black ink and the color ink, also resulting in a decrease in printing speed.

SUMMARY OF THE INVENTION

The present invention has been made in view of the above circumstances and provides an ink jet recording apparatus and an ink jet recording method.

According to one aspect of the present invention, there is provided an ink jet recording apparatus comprising: a black print head that discharges black ink; a color print head that discharges color ink having a higher permeability with a recording paper sheet than the black ink; and a determining unit that detects, based on input data, a black image region in which recording is performed with the black ink and a color image region in which recording is performed with the color ink, and, based on the detection result, determines whether the black ink or the color ink is first applied onto the recording paper sheet, each of the black print head and the color print head having nozzles divided into a plurality of sets, and a multi-path recording operation being performed by scanning each recording region a plurality of times with the plurality of sets of nozzles.

According to another aspect of the present invention, there is provided an ink jet recording method for performing a multi-path recording operation with a black print head that discharges black ink and a color print head that discharges color ink having a higher permeability with a recording paper sheet than the black ink, each of the print heads having nozzles being divided into a plurality of sets, and the multi-path recording operation being performed by scanning each recording region a plurality of times with the plurality of sets of nozzles, the method comprising the steps of: detecting, based on input data, a black image region in which recording is performed with the black ink and a color image region in which recording is performed with the color ink; and determining, based on the detection result, whether the black ink or the color ink is first used to perform recording on the recording paper sheet.

BRIEF DESCRIPTION OF THE DRAWINGS

Preferred embodiments of the present invention will be described in detail based on the following figures, wherein:

FIGS. 2A and 2B illustrate a pixel data region detecting operation to be performed by the region detecting unit of the color ink jet recording apparatus;

FIG. 3 is a table that is used to perform a pixel converting process in accordance with the first embodiment;

FIG. 5 is a table that is used to determine the printing order in accordance with the first embodiment;

FIG. 6 shows examples of print rates set for the print head in a multi-path printing operation in accordance with the first embodiment;

FIGS. 7A through 7C illustrate a recording operation based on the multi-path print data in the first embodiment;

FIG. 8 is a table that is used to determine the printing order in accordance with a second embodiment of the present invention;

FIG. 11 is a table that is used to determine the printing order in accordance with a third embodiment of the present invention;

FIG. 14 is a table that is used to determine the printing order in accordance with a fourth embodiment of the present invention;

DESCRIPTION OF THE PREFERRED EMBODIMENTS

The following is a description of preferred embodiments of the present invention, with reference to the accompanying drawings.

Figure 1:
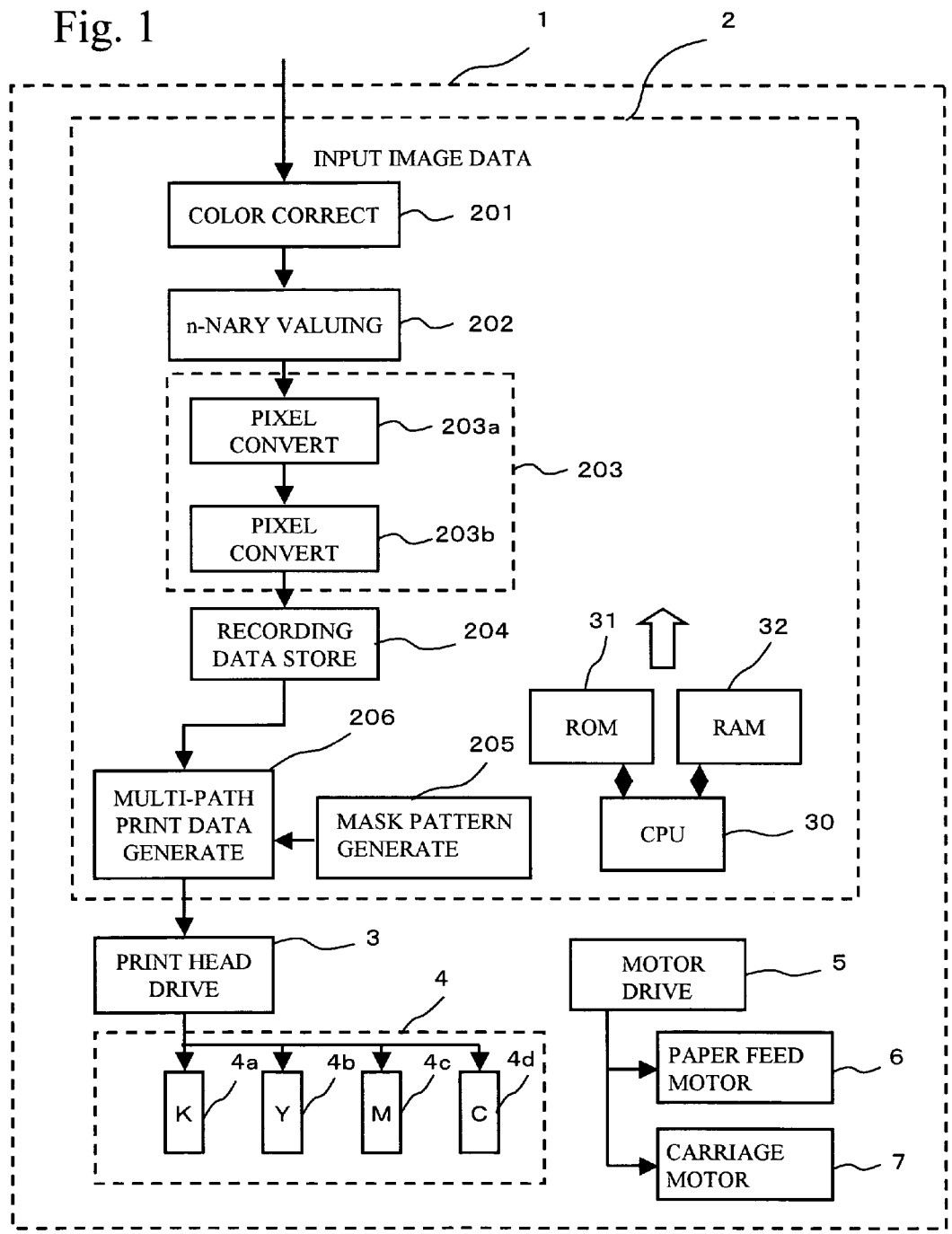
FIG. 1 is a block diagram of a color ink jet recording apparatus in accordance with a first embodiment of the present invention.

FIG. 1 is a block diagram of an ink jet recording apparatus in accordance with a first embodiment of the present invention. The ink jet recording apparatus 1 divides the nozzle of each print head into several blocks, and performs multi-path recording by scanning each recording area with different nozzles several times.

As shown in FIG. 1, the ink jet recording apparatus 1 includes an image processing device 2, a print head drive unit 3, a print head 4, a motor drive unit 5, a paper feeding motor 6, and a carriage motor 7. The image processing device 2 includes a color correction unit 201, an n-nary valuing processing unit 202, an image processing unit 203, a recording data storing unit 204, a mask pattern generating unit 205, and a multi-path print data generating unit 206.

The image processing device 2 is realized by a CPU (Central Processing Unit) 30, a ROM (Read Only Memory) 31, and a RAM (Random Access Memory) 32. The CPU 30 loads an image processing program from the ROM 31 into the RAM 32, and controls image processing operations and the motor drive unit 5.

The color correction unit 201 inputs image information of RGB (red, green, and blue) data, and performs a correcting operation such as gamma correction on the input image information. The color correction unit 201 also performs a color conversion operation to convert the input image information into CMYK (cyan, magenta, yellow, and black) data, as well as other various adjusting operations.

The n-nary valuing processing unit 202 turns the image data (gradation data) of each color component (C, M, Y, or K) into n-nary valued data, using a predetermined threshold value, and generates print data that include the bit values (01 or 00) of each color component. More specifically, the n-nary valuing processing unit 202 generates print data $P_{ij}=\{C_{ij}, M_{ij}, Y_{ij}, K_{ij}\}$ that include the bit values $C_{ij}$, $M_{ij}$, $Y_{ij}$, and $K_{ij}$ of the color components of cyan (C), magenta (M), yellow (Y), and black (K) corresponding to the pixels (i, j) of the image data outputted from the color correction unit 201. Among the pixels (i, j) of the image data, $N_I$ (the 0th to the $N_{I-1}$th) of pixels are arranged in the horizontal direction, and $N_J$ (the 0th to the $N_{J-1}$th) of pixels are arranged in the vertical direction.

The image processing unit 203 includes a region detecting unit 203a and a pixel converting unit 203b. The region detecting unit 203a detects black image regions in which recording is performed with black ink based on supplied print data, color image regions in which recording is performed with color ink, black image boundary regions that are located in predetermined regions in the black image regions, and color image boundary regions that are located in predetermined regions in the color image regions. Here, each of the "predetermined regions" is a region on the boundary between a black pixel and a color pixel. Accordingly, the black image boundary regions are predetermined print regions of the black ink that are adjacent to the print regions of the color ink (for example, a group of pixels that are within a range of p pixels from the color-ink pixels and are to be colored with the black ink). The color image boundary regions are predetermined print regions of the color ink that are adjacent to the print regions of the black ink (for example, a group of pixels that are within a range of q pixels from the black-ink pixels and are to be colored with the color ink). Hereinafter, the parts of the black image regions excluding the black image boundary regions will be referred to as "black image inner regions", and the parts of the color image regions excluding the color image boundary regions will be referred to as "color image inner regions". The regions that are not included in any of the above regions, i.e., black or color pixel regions 24 that are adjacent to white regions (non-print regions), are not involved in the operations in accordance with the present invention, and therefore, are not shown in the drawings.

The pixel converting unit 203b converts the pixels of the n-nary valued CMYK data in the black image regions or the color image regions into predetermined pixels, based on the result of pixel region detection. The converting process is performed in accordance with predetermined pixel converting rules. The pixel converting unit 203b also performs embedding of additional information. In the pixel converting process, the black pixels are replaced with color pixels or color pixels are added in the black image boundary regions and the black pixel regions of the color image boundary regions in accordance with the pixel converting rules. In the color pixel regions, thinning is performed on the color pixels. In the black image inner regions, thinning is performed on the black pixels, the black pixels are replaced with color pixels, or color pixels are added. The pixel converting rules may be selected from preset values for each region, or depending on other factors such as paper print mode. The pixel converting unit 203b may only perform the embedding of additional information, not performing the pixel converting process.

The print data of each converted pixel obtained through the pixel converting unit 203b are stored in a predetermined area in the recording data storing unit 204. Based on the additional information, the mask pattern generating unit 205 generates a multi-path mask pattern to be used in a data mask process, and outputs the multi-path mask pattern to the multi-path print data generating unit 206. The mask pattern generating unit 205 may generate a mask pattern to be used in each scan, depending on the number of scans of each print head 4.

Based on the print data having the additional information added thereto, the multi-path print data generating unit 206 distinguishes between the black image regions and the color image regions in each main print scan. In accordance with the result, the multi-path print data generating unit 206 determines which ink should be first used to perform recording on a recording paper sheet, between the black ink and the color ink. Here, each pixel is determined whether to be printed in the former path in a multi-path printing operation (whether the pixel should be formed first on the paper sheet), or whether to be printed in the latter path in the multi-path printing operation (whether the pixel should be formed later on the paper sheet). The multi-path print data generating unit 206 also controls the print rate of data to be supplied to the print head 4, using the mask pattern generated by the mask pattern generating unit 205. The multi-path print data generating unit 206 then generates multi-path print data, and outputs the multi-path print data to the print head drive unit 3. The number of scans in each multi-path recording operation should be an even number, so that printing can be started from the same end in each scan-recording area on the paper sheet. In this manner, the print color order is not varied, and unevenness in each color can be prevented. Also, the number of blocks obtained by dividing each print head 4 should be equal to the number obtained by dividing the number of nozzles of each print head 4 by the number of scans.

In accordance with the bit values of the color components contained in the print data supplied from the multi-path print data generating unit 206, the print head drive unit 3 controls the switching on and off of ink heads 4a through 4d corresponding to the color components. The print head 4 includes the black ink head 4a that discharges black ink (K), the yellow ink head 4b that discharges yellow ink (Y), the magenta ink head 4c that discharges magenta ink (M), and the cyan ink head 4d that discharges cyan ink (C). The driving of the ink heads 4a through 4d is controlled by the print head drive unit 3. In the first embodiment, the black ink has a relatively low permeability, while the color inks have a relatively high permeability.

The motor drive unit 5 is controlled by the CPU 30 to control the driving of the paper feeding motor 6 and the carriage motor 7. The paper feeding motor 6 serves to move recording paper sheets. The carriage motor 7 serves to move the print head 4.

Next, the image data region detecting operation to be performed by the region detecting unit 203a is described. FIGS. 2A and 2B illustrate the image data region detecting operation of the region detecting unit 203a. FIG. 2A shows an input image, and FIG. 2B shows an example of a pixel converted and information added region. In FIG. 2A, reference numeral 10 indicates a black ink print region, and reference numeral 11 indicates a color ink print region.

In FIG. 2B, reference numeral 20 indicates a black image inner region, reference numeral 21 indicates a black image boundary region, reference numeral 22 indicates a color image inner region, and reference numeral 23 indicates a color image boundary region. The black image inner region 20 and the black image boundary region 21 correspond to the black ink print region 10, and the color image inner region 22 and the color image boundary region 23 correspond to the color ink print region 11.

Based on the print data outputted from the n-nary valuing processing unit 202, the region detecting unit 203a detects the black image boundary region 21 and the color image boundary region 23 that belong to the boundary region between the print region of the black ink (K) and the print region of the color inks (C, M, Y). Here, the black image boundary region 21 is a predetermined print area of the black ink adjacent to the color ink print region 11. In the example shown in FIG. 2B, the black image boundary region 21 is formed with a group of pixels that are to be colored with the black ink and are located within a range of 2 pixels from the pixels to be colored with the color inks.

The color image boundary region 23 is a predetermined print region of the color inks adjacent to the black ink print region 10. The color image boundary region 23 is formed with a group of pixels that are to be colored with the color inks and are located within a range of 2 pixels from the pixels to be colored with the black ink. In this manner, the region detecting unit 203a detects the black image boundary region 21 and the color image boundary region 23, so as to prevent ink bleeding in the boundary region between the black ink and the color inks.

Figure 4A:
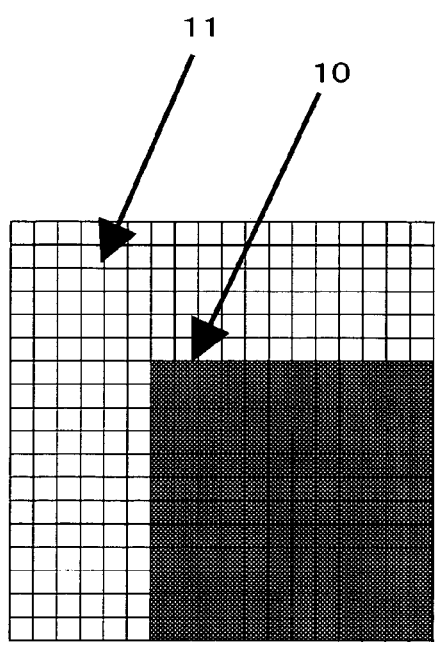
FIG. 4A shows an example of input image data in a pixel converting process.
Figure 4B:
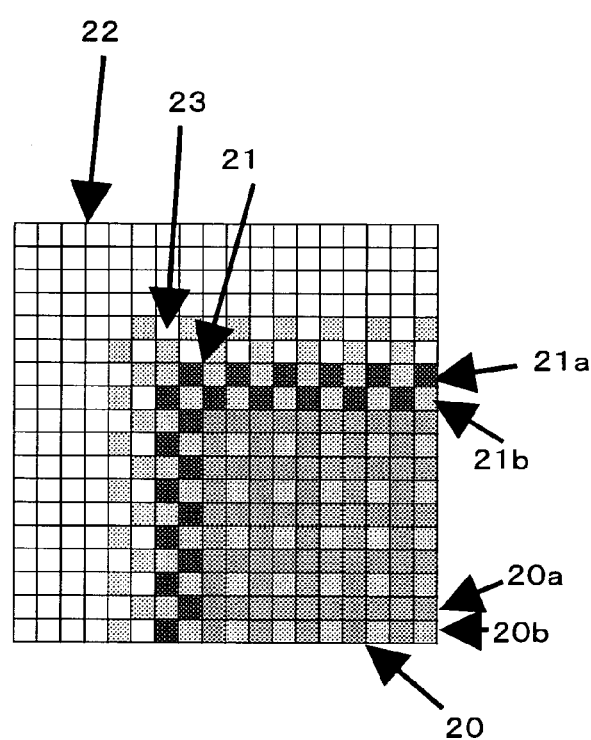
FIG. 4B shows image data after the pixel converting process.

Referring now to FIG. 3 and FIGS. 4A and 4B, the pixel converting operation to be performed by the pixel converting unit 203b is described. FIG. 3 is a table of pixel conversion rules. The pixel converting unit 203b performs pixel conversion on the black image inner region 20, the black image boundary region 21, the color image inner region 22, and the color image boundary region 23, in accordance with the conversion rule table shown in FIG. 3. The pixel converting unit 203b also embeds the information necessary for pixel conversion before printing as the additional information in the print data.

More specifically, the pixel converting unit 203b performs thinning of the black pixels and adds color pixels in the black image inner region 20. In the black image boundary region 21, the pixel converting unit 203b also performs thinning of the black pixels and adds color pixels. In the color image inner region 22, the pixel converting unit 203b does not perform pixel conversion, as the regular printing is performed in the region. In the color image boundary region 23, the pixel converting unit 203b performs thinning of the color pixels. In the other regions (denoted by reference numeral 24), black or color pixel conversion is not performed, as the regular printing is performed in those regions.

FIGS. 4A and 4B illustrate an example of the pixel converting operation. FIG. 4A shows input image data, and FIG. 4B shows image data after pixel conversion. In FIG. 4A, reference numeral 10 indicates a black ink print region, and reference numeral 11 indicates a color ink print region. In FIG. 4B, reference numeral 20 indicates a black image inner region, reference numeral 21 indicates a black image boundary region, reference numeral 22 indicates a color image inner region, and reference numeral 23 indicates a color image boundary region.

In the black image inner region 20, black pixels 20a are thinned, and color pixels 20b are added to the thinned pixels. By doing so, the drying rate of the black ink is increased so as to prevent ink bleeding. In the black image boundary region 21, black pixels 21a are thinned, and color pixels 21b are added to the thinned pixels. By doing so, the drying rate of the black ink is increased so as to prevent ink bleeding. In the color image boundary region 23, the pixels contained therein are thinned. In this manner, the pixel converting operation is performed in each region, so that the black ink and the color inks can be prevented from bleeding.

Referring now to FIGS. 5 and 6, the multi-path print data to be generated by the multi-path print data generating unit 206 are described. In the first embodiment, a 2-path recording method is employed. By this method, each recording image region is formed by two scans with the recording head. FIG. 5 shows a table that is used to determine the printing order in the first embodiment. In FIG. 5, each value of the input pixel data represents a data value. The input pixel data are made up of black pixels in the black image inner region 20 and the black image boundary region 21, and are made up of color pixels in the color image inner region 22 and the color image boundary region 23.

Receiving the input pixel data from the recording data storing unit 204, the multi-path print data generating unit 206 refers to the table shown in FIG. 5, and determines whether the pixels should be printed in the former path or the latter path as described later. In the other regions 24 that are not included in the regions 20 through 23, regular multi-path printing is performed, without a specific printing path order.

In the black image inner region 20, the color pixels are printed in the former scan ('11'), and the black pixels are printed in the latter scan ('11'). In the black image boundary region 21, the black pixels are printed in the former scan ('10'). In the color image inner region 22, print control based on the additional information is not performed. In the color image boundary region 23, the color pixels are printed in the latter scan ('10'). In the other regions 24, print control based on the additional information is not performed.

In this manner, between the black ink having a relatively low permeability and the color inks each having a relatively high permeability, the black ink is first used in the printing regions in which the black ink region and the color ink region are adjacent to each other. After a sufficient permeating and drying time, the color inks are used. Thus, ink bleeding can be reduced. In a print region with a large black ink area, the color inks having a higher permeability are used before the black ink printing, so as to increase the drying rate (fixability) of the black ink.

After determining the printing order for each region, the multi-path print data generating unit 206 sets the print rates of the print head 4. FIG. 6 shows examples of the print rates of the print head 4 in a multi-path printing operation. In the example shown in FIG. 6, the print head 4 includes N nozzles (1 through N).

The multi-path print data generating unit 206 sets the print rates of the print head 4 so that the first through N/2th nozzles of the print head 4 are used in the first scan to apply ink onto a half of the region, and the ((N/2)+1)th through Nth nozzles of the print head 4 are used in the second scan to apply ink onto the same region.

In FIG. 6, "0%" indicates that printing is not performed by the scan in the region, "100%" indicates that all the pixels in the region are printed by the scan, and "50%" indicates that printing is performed in a thinned half of the region by the scan, using a pair of mask patterns for completing an image by two scans. The thinning rate is determined by the mask patterns generated by the mask pattern generating unit 205.

In the black image inner region 20, the print rate of the print head 4 is set so that the color inks are applied by the first scan using the first through N/2th nozzles of the print head 4, and the black ink is applied by the second scan using the ((N/2)+1)th through Nth nozzles of the print head 4.

In the black image boundary region 21, the print rate of the print head 4 is set so that the black ink is applied by the first scan using the first through N/2th nozzles of the print head 4. In the color image boundary region 23, the print rate of the print head 4 is set so that any ink is not applied by the first scan and the color inks are applied by the second scan using the ((N/2)+1)th through Nth nozzles of the print head 4.

In the color image inner region 22, the print rate of the print head 4 is set so that the color inks are applied to the region 22 thinned to ½ by the first scan using the first through N/2th nozzles of the print head 4, and the color inks are applied by the second scan using the ((N/2)+1)th through Nth nozzles of the print head 4.

Next, a recording operation based on the multi-path print data is described. FIGS. 7A through 7C illustrate the recording operation based on the multi-path print data in the first embodiment. FIG. 7A shows original image data, FIG. 7B shows an image forming process by a conventional 2-path printing technique, and FIG. 7C shows an image forming process in accordance with the first embodiment. In the examples shown in FIGS. 7A through 7C, the number of nozzles of the print head 4 is 18. Accordingly, N in FIG. 6 is 18. Here, the information adding and pixel converting operations are not performed in the other regions 24 (not shown) that are not included in the black and color image boundary and inner regions, and the same multi-path printing as in the prior art is performed in those regions 24. The same applies to the embodiments and examines described below.

In each of FIGS. 7A through 7C, reference numeral 20 indicates a black image inner region, reference numeral 21 indicates a black image boundary region, reference numeral 22 indicates a color image inner region, and reference numeral 23 indicates a color image boundary region. As shown in FIG. 7B, by the conventional technique, the black ink is applied onto the upper half of each of the black image inner region 20 and the black image boundary region 21 by the first scan (path 1) using the first through ninth nozzles of the print head 4 and a mask pattern.

In the color image inner region 22 and the color image boundary region 23, the color inks are applied onto each upper half of the regions 22 and 23 by the first scan using the first through ninth nozzles of the print head 4 and a mask pattern.

The paper feeding motor 6 then transports the recording paper sheet in the sub scanning direction. The black ink is then applied onto the upper half of each of the black image inner region 20 and the black image boundary region 21 by the second scan (path 2) in the opposite direction from the first scan, using the tenth through eighteenth nozzles of the print head 4 and a mask pattern. By doing so, the image formation in the upper half of each of the black image inner region 20 and the black image boundary region 21 is completed. At the same time, the black ink is applied to the lower half of each of the black image inner region 20 and the black image boundary region 21, using the first through ninth nozzles of the print head 4 and a mask pattern.

Meanwhile, the color inks are applied to the upper half of each of the color image inner region 22 and the color image boundary region 23 by the second scan using the tenth through eighteenth nozzles of the print head 4 and a mask pattern. By doing so, the image formation in the upper half of each of the color image inner region 22 and the color image boundary region 23 is completed. At the same time, the color inks are applied to the lower half of each of the color image inner region 22 and the color image boundary region 23, using the first through ninth nozzles of the print head 4 and a mask pattern.

The paper feeding motor 6 then transports the recording paper sheet in the sub scanning direction. The black ink is then applied onto the lower half of each of the black image inner region 20 and the black image boundary region 21 by the third scan (path 3) in the same direction as the first scan, using the tenth through eighteenth nozzles of the print head 4 and a mask pattern. By doing so, the image formation in the lower half of each of the black image inner region 20 and the black image boundary region 21 is completed.

In the color image inner region 22 and the color image boundary region 23, the color inks are applied onto each lower half of the regions 22 and 23 by the third scan using the tenth through eighteenth nozzles of the print head 4 and a mask pattern. In this conventional example, however, ink bleeding is caused by the black ink and the color inks, because the black image boundary region 21 and the color image boundary region 23 are simultaneously formed by the same scans.

In the first embodiment, on the other hand, the color inks are applied onto the upper half of the black image inner region 20 by the first scan using the first through ninth nozzles of the print head 4, as shown in FIG. 7C. Here, the black ink is not applied onto the same region. In the black image boundary region 21, the black ink is applied onto the upper half of the region 21 by the first scan using the first through ninth nozzles of the print head 4.

In the color image inner region 22, the color inks are applied onto the upper half of the region 22 by the first scan using the first through ninth nozzles of the print head 4 and a mask pattern. In the color image boundary region 23, any ink is not applied by the first scan. Accordingly, ink bleeding is not caused by the black ink and the color inks in the boundary regions.

The paper feeding motor 6 then transports the recording paper in the sub scanning direction. The black ink is then applied onto the upper half of the black image inner region 20 by the second scan in the opposite direction from the first scan, using the tenth through eighteenth nozzles of the print head 4. As the color pixels have already been printed and the ink permeability has been improved accordingly in the black image inner region 20, the drying rate and the fixability of the black ink are dramatically improved. At the same time, the color inks are applied onto the lower half of the black image inner region 20, using the first through ninth nozzles of the print head 4.

In the black image boundary region 21, the black ink is applied onto the lower half of the region 21 by the second scan using the first through ninth nozzles of the print head 4. In the color image inner region 22, the color inks are applied onto the upper half of the region 22 by the second scan using the tenth through eighteenth nozzles of the print head 4 and a mask pattern. At the same time, the color inks are applied to the lower half of the region 22, using the first through ninth nozzles of the print head 4 and a mask pattern.

In the color image boundary region 23, the color inks are applied onto the upper half of the region 23 by the second scan using the tenth through eighteenth nozzles of the print head 4. Since the adjacent black image boundary region 21 has already been formed by the first scan, bleeding of the adjacent color inks can be reduced.

The paper feeding motor 6 then transports the recording paper in the sub scanning direction. The black ink is then applied onto the lower half of the black image inner region 20 by the third scan in the same direction as the first scan, using the tenth through eighteenth nozzles of the print head 4. As the color pixels have already been printed and the ink permeability has been improved accordingly in the black image inner region 20, the drying rate and the fixability of the black ink are dramatically improved.

In the color image inner region 22, the color inks are applied onto the lower half of the region 22 by the third scan using the tenth through eighteenth nozzles of the print head 4 and a mask pattern. In the color image boundary region 23, the color inks are applied onto the lower half of the region 23 by the third scan using the tenth through eighteenth nozzles of the print head 4.

In accordance with the first embodiment, the scan for recording the color image region located in a predetermined region in the boundary region is carried out after the scan for recording the black image region, so that a certain period of time can be maintained between the black ink recording and the color ink recording. In this manner, ink bleeding of the black ink and the color inks can be reduced. Also, as the multi-path printing is performed as usual, the printing speed does not decrease. Furthermore, image deterioration due to the pixel converting operation, which has been a problem with the prior art, can be prevented.

Also, in accordance with the first embodiment, prior to the black ink recording, the color ink recording is performed in a predetermined region in the black image region to be colored with the black ink. In this manner, the ink permeability is increased, and the drying rate and the fixability of the black ink can also be increased. Furthermore, the scan for recording with the color inks is carried out before the scan for recording the predetermined region in the black image region with the black ink. Accordingly, the drying rate of the black ink can be increased, and ink bleeding can be prevented.

In FIG. 7C, only the color pixel addition to the black image inner region 20 is shown as an example of the pixel converting operation. However, thinning may also be performed in the color image region, if necessary, to optimize the effect. Also, as the multi-path print data are generated based on region information, the region data having no specific ink applying order are not changed at all. Accordingly, the injecting frequencies of the injection nozzles of the print head 4 are substantially uniform.

Second Embodiment

Figure 9:
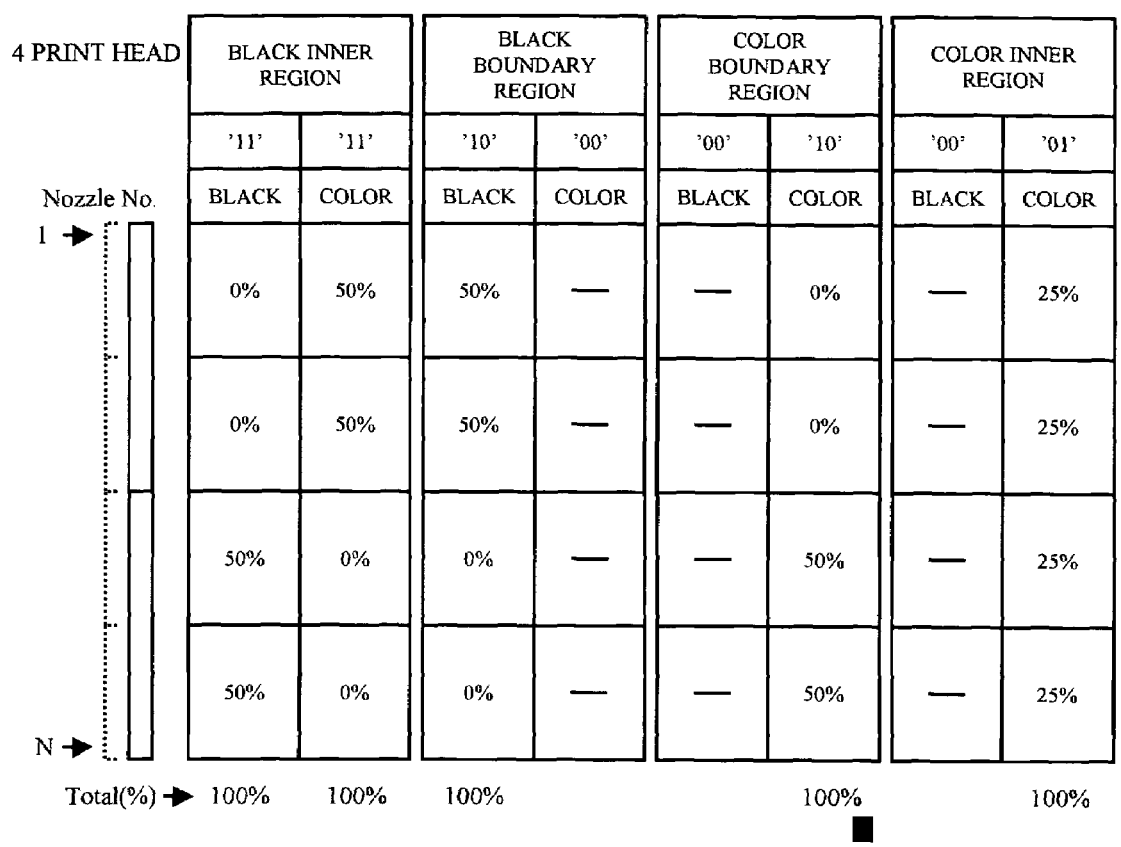
FIG. 9 shows examples of print rates set for the print head in a multi-path printing operation in the second embodiment.

Next, a second embodiment of the present invention is described. The second embodiment differs from the first embodiment only in its operation, and therefore, has the same structure as the color ink jet recording apparatus 1 of the first embodiment. In the second embodiment, a black ink having a relatively low permeability and color inks each having a relatively high permeability are used as in the first embodiment. Referring to FIGS. 8 and 9, the multi-path print data to be generated by the multi-path print data generating unit 206 are first described. In the second embodiment, a 4-path recording method is employed to form each recording image region by four scans with the print head 4.

FIG. 8 shows a table that is used to determine the printing order in the second embodiment. In FIG. 8, each value of the input pixel data represents a data value. The input pixel data are made up of black pixels in the black image inner region 20 and the black image boundary region 21, and are made up of color pixels in the color image inner region 22 and the color image boundary region 23.

Receiving the input pixel data from the recording data storing unit 204, the multi-path print data generating unit 206 refers to the table shown in FIG. 8, and determines whether the pixels should be printed in the former path or the latter path as described later.

In the black image inner region 20, the color pixels are printed by the former scan ('11'), and the black pixels are printed by the latter scan ('11'). In the black image boundary region 21, the black pixels are printed by the former scan ('10'). In the color image inner region 22, print control based on the additional information is not performed. In the color image boundary region 23, the color pixels are printed by the latter scan ('10').

In this manner, between the black ink having a relatively low permeability and the color inks each having a relatively high permeability, the black ink is first applied in the printing regions in which a black ink region and a color ink region are adjacent to each other. After a sufficient permeating and drying time, the color inks are applied. Thus, ink bleeding can be reduced. In a print region with a large black ink area, the color inks having a higher permeability are used before the black ink printing, so as to increase the drying rate (fixability) of the black ink.

After determining the printing order for each region, the multi-path print data generating unit 206 sets the print rates of the print head 4. FIG. 9 shows examples of the print rates of the print head 4 in a multi-path printing operation. The multi-path print data generating unit 206 sets the print rates of the print head 4 so that the first through N/4th nozzles of the print head 4 are used in the first scan to apply ink onto a quarter of the region, the ((N/4)+1)th through N/2th nozzles of the print head 4 are used in the second scan to apply ink onto the same region, the ((N/2)+1)th through N×¾th nozzles of the print head 4 are used in the third scan to apply ink onto the same region, and the ((N×¾)+1)th through Nth nozzles of the print head 4 are used in the fourth scan to apply ink onto the same region.

In FIG. 9, "0%" indicates that printing is not performed by the scan in the region, "50%" indicates that printing is performed in a thinned half of the region by the scan, and "25%" indicates that printing is performed by the scan in the region thinned to ¼, using a set of mask patterns for completing an image by four scans. The thinning rate is determined by the mask patterns generated by the mask pattern generating unit 205.

In the black image inner region 20, the print rate of the print head 4 is set so that the color inks are applied by the first scan using the first through N/4th nozzles of the print head 4 in a quarter of the region 20 thinned to 25%, the color inks are applied by the second scan using the ((N/4)+1)th through N/2th nozzles of the print head 4 in the same region thinned to 25%, the black ink is applied by the third scan using the ((N/2)+1)th through N×¾th nozzles of the print head 4 in the same region thinned to 25%, and the black ink is applied by the fourth scan using the ((N×¾)+1)th through Nth nozzles of the print head 4 in the same region thinned to 25%.

In the black image boundary region 21, the print rate of the print head 4 is set so that the black ink is applied by the first scan using the first through N/4th nozzles of the print head 4 in a quarter of the region 21 thinned to 25%, and the black ink is applied by the second scan using the ((N/4)+1)th through N/2th nozzles of the print head 4 in the same region thinned to 25%.

In the color image boundary region 23, the print rate of the print head 4 is set so that any ink is not applied by the first and second scans, the color inks are applied by the third scan using the ((N/2)+1)th through N×¾th nozzles of the print head 4 in a quarter of the region 23 thinned to 50%, and the color inks are applied by the fourth scan using the ((N×¾)+1)th through Nth nozzles of the print head 4 in the same region thinned to 50%.

In the color image inner region 22, the print rate of the print head 4 is set so that the color inks are applied by the first scan using the first through N/4th nozzles of the print head 4 in a quarter of the region 22 thinned to 25%, the color inks are applied by the second scan using the ((N/4)+1)th through N/2th nozzles of the print head 4 in the same region thinned to 25%, the color inks are applied by the third scan using the ((N/2)+1)th through N×¾th nozzles of the print head 4 in the same region thinned to 25%, and the color inks are applied by the fourth scan using the ((N×¾)+1)th through Nth nozzles of the print head 4 in the same region thinned to 25%.

Figure 10A:
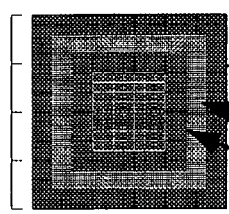
FIGS. 10A through 10C illustrate a recording operation based on the multi-path print data in the second embodiment.
Figure 10B:
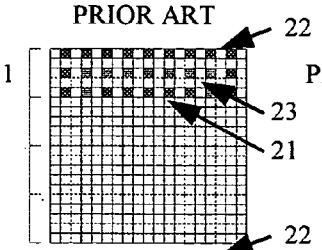
Figure 10B:
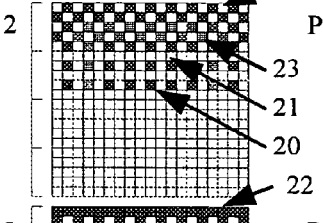
Figure 10B:
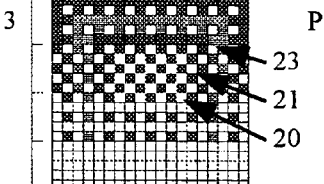
Figure 10B:
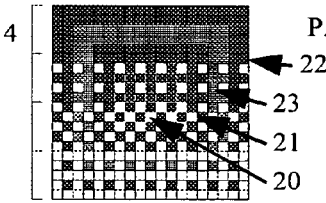
Figure 10B:
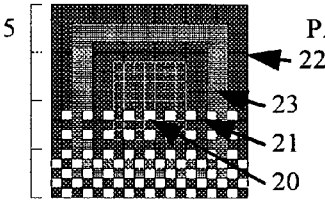
Figure 10B:
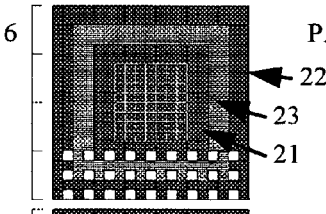
Figure 10B:
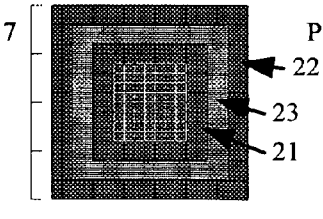
Figure 10C:
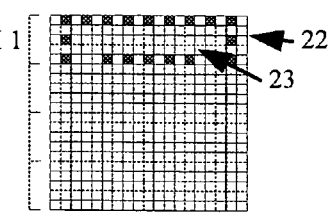
Figure 10C:
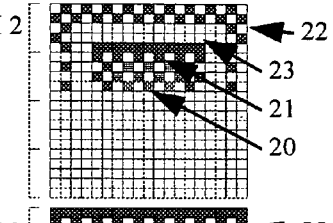
Figure 10C:
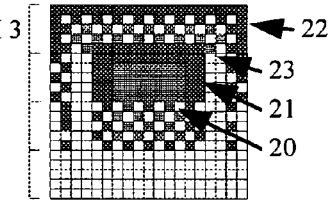
Figure 10C:
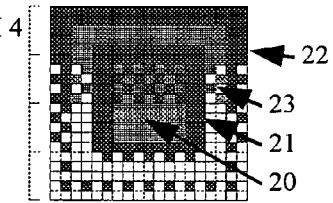
Figure 10C:
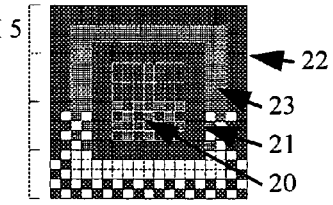
Figure 10C:
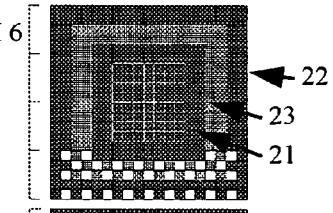
Figure 10C:
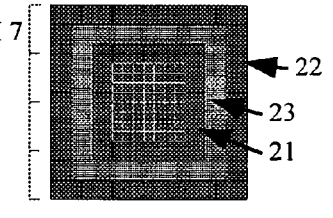

Next, a recording operation based on the multi-path print data is described. FIGS. 10A through 10C illustrate the recording operation based on the multi-path print data in the second embodiment. FIG. 10A shows original image data, FIG. 10B shows an image forming process by a conventional 4-path printing technique, and FIG. 10C shows an image forming process in accordance with the second embodiment. In the examples shown in FIGS. 10A through 10C, the number of nozzles of the print head 4 is 20. Accordingly, N in FIG. 9 is 20.

In each of FIGS. 10A through 10C, reference numeral 20 indicates a black image inner region, reference numeral 21 indicates a black image boundary region, reference numeral 22 indicates a color image inner region, and reference numeral 23 indicates a color image boundary region. As shown in FIG. 10B, by the conventional technique, the black ink is applied onto the top quarter of the black image boundary region 21 by the first scan (path 1) using the first through fifth nozzles of the print head 4 and a mask pattern.

In the color image inner region 22, the color inks are applied onto the top quarter of the region 22 by the first scan using the first through fifth nozzles of the print head 4 and a mask pattern. In the color image boundary region 23, the color inks are applied onto the top quarter of the region 23 by the first scan using the first through fifth nozzles of the print head 4 and a mask pattern.

The paper feeding motor 6 then transports the recording paper sheet in the sub scanning direction. In the black image inner region 20, the black ink is applied onto the second quarter of the region 20 from the top by the second scan (path 2) in the opposite direction from the first scan, using the first through fifth nozzles of the print head 4 and a mask pattern.

In the black image boundary region 21, the black ink is applied onto the second quarter of the region 21 from the top by the second scan using the first through fifth nozzles of the print head 4 and a mask pattern. In the color image inner region 22, the color inks are applied onto the top quarter of the region 22 by the second scan using the sixth through tenth nozzles of the print head 4 and a mask pattern. At the same time, the color inks are applied also onto the second quarter of the color image inner region 22 from the top, using the first through fifth nozzles of the print head 4 and a mask pattern.

In the color image boundary region 23, the color inks are applied onto the top quarter of the region 23 by the second scan using the sixth through tenth nozzles of the print head 4 and a mask pattern. At the same time, the color inks are applied also onto the second quarter of the region 23 from the top, using the first through fifth nozzles of the print head 4 and a mask pattern.

The paper feeding motor 6 then transports the recording paper sheet in the sub scanning direction. In the black image inner region 20, the black ink is applied onto the second quarter of the region 20 from the top by the third scan (path 3) in the same direction as the first scan, using the sixth through tenth nozzles of the print head 4 and a mask pattern. At the same time, the black ink is applied also onto the third quarter of the region 20 from the top, using the first through fifth nozzles of the print head 4 and a mask pattern.

In the black image boundary region 21, the black ink is applied onto the top quarter of the region 21 by the third scan using the eleventh through fifteenth nozzles of the print head 4 and a mask pattern. At the same time, the black ink is applied onto the second quarter of the region 21 from the top, using the sixth through tenth nozzles of the print head 4 and a mask pattern, and the black ink is applied also onto the third quarter of the region 21 from the top, using the first through fifth nozzles of the print head 4 and a mask pattern.

In the color image inner region 22, the color inks are applied onto the top quarter of the region 22 by the third scan using the eleventh through fifteenth nozzles of the print head 4 and a mask pattern. At the same time, the color inks are applied onto the second quarter of the region 22 from the top, using the sixth through tenth nozzles of the print head 4 and a mask pattern, and the color inks are applied also onto the third quarter of the region 22 from the top, using the first through fifth nozzles of the print head 4 and a mask pattern.

In the color image boundary region 23, the color inks are applied onto the top quarter of the region 23 by the third scan using the eleventh through fifteenth nozzles of the print head 4 and a mask pattern. At the same time, the color inks are applied onto the second quarter of the region 23 from the top, using the sixth through tenth nozzles of the print head 4 and a mask pattern, and the color inks are applied also onto the third quarter of the region 23 from the top, using the first through fifth nozzles of the print head 4 and a mask pattern.

The paper feeding motor 6 then transports the recording paper sheet in the sub scanning direction. In the black image inner region 20, the black ink is applied onto the second quarter of the region 20 from the top by the fourth scan (path 4) in the opposite direction from the first scan, using the eleventh through fifteenth nozzles of the print head 4 and a mask pattern, and the black ink is applied also onto the third quarter of the region 20 from the top by the fourth scan using the sixth through tenth nozzles of the print head 4 and a mask pattern.

In the black image boundary region 21, the black ink is applied onto the second quarter of the region 21 from the top by the fourth scan using the eleventh through fifteenth nozzles of the print head 4 and a mask pattern, and the black ink is applied also onto the third quarter of the region 21 from the top by the fourth scan using the sixth through tenth nozzles of the print head 4 and a mask pattern.

In the color image inner region 22, the color inks are applied onto the top quarter of the region 22 by the fourth scan using the sixteenth through twentieth nozzles of the print head 4 and a mask pattern. At the same time, the color inks are applied onto the second quarter of the region 22 from the top, using the eleventh through fifteenth nozzles of the print head 4 and a mask pattern, and the color inks are applied also onto the third quarter of the region 22 from the top, using the sixth through tenth nozzles of the print head 4 and a mask pattern. Further, the color inks are applied onto the fourth quarter of the region 22 from the top, using the first through fifth nozzles of the print head 4 and a mask pattern.

In the color image boundary region 23, the color inks are applied onto the top quarter of the region 23 by the fourth scan using the sixteenth through twentieth nozzles of the print head 4 and a mask pattern. At the same time, the color inks are applied onto the second quarter of the region 23 from the top, using the eleventh through fifteenth nozzles of the print head 4 and a mask pattern, and the color inks are applied also onto the third quarter of the region 23 from the top, using the sixth through tenth nozzles of the print head 4 and a mask pattern. Further, the color inks are applied onto the fourth quarter of the region 23 from the top, using the first through fifth nozzles of the print head 4 and a mask pattern.

The paper feeding motor 6 then transports the recording paper sheet in the sub scanning direction. In the black image inner region 20, the black ink is applied onto the second quarter of the region 20 from the top by the fifth scan (path 5) in the same direction as the first scan, using the sixteenth through twentieth nozzles of the print head 4 and a mask pattern, and the black ink is applied also onto the third quarter of the region 20 from the top by the fifth scan using the eleventh through fifteenth nozzles of the print head 4 and a mask pattern.

In the black image boundary region 21, the black ink is applied onto the second quarter of the region 21 from the top by the fifth scan using the sixteenth through twentieth nozzles of the print head 4 and a mask pattern, and the black ink is applied also onto the third quarter of the region 21 from the top by the fifth scan using the eleventh through fifteenth nozzles of the print head 4 and a mask pattern. Further, the black ink is applied onto the fourth quarter of the region 21 from the top by the fifth scan using the sixth through tenth nozzles of the print head 4 and a mask pattern.

In the color image inner region 22, the color inks are applied onto the second quarter of the region 22 from the top by the fifth scan using the sixteenth through twentieth nozzles of the print head 4 and a mask pattern, and the color inks are applied also onto the third quarter of the region 22 from the top by the fifth scan using the eleventh through fifteenth nozzles of the print head 4 and a mask pattern. Further, the color inks are applied onto the fourth quarter of the region 22 from the top by the fifth scan using the sixth through tenth nozzles of the print head 4 and a mask pattern.

In the color image boundary region 23, the color inks are applied onto the second quarter of the region 23 from the top by the fifth scan using the sixteenth through twentieth nozzles of the print head 4 and a mask pattern, and the color inks are applied also onto the third quarter of the region 23 from the top by the fifth scan using the eleventh through fifteenth nozzles of the print head 4 and a mask pattern. Further, the color inks are applied onto the fourth quarter of the region 23 from the top by the fifth scan using the sixth through tenth nozzles of the print head 4 and a mask pattern.

The paper feeding motor 6 then transports the recording paper sheet in the sub scanning direction. In the black image inner region 20, the black ink is applied onto the third quarter of the region 20 from the top by the sixth scan (path 6) in the opposite direction from the first scan, using the sixteenth through twentieth nozzles of the print head 4 and a mask pattern. In the black image boundary region 21, the black ink is applied onto the third quarter of the region 21 from the top by the sixth scan using the sixteenth through twentieth nozzles of the print head 4 and a mask pattern.

In the color image inner region 22, the color inks are applied onto the third quarter of the region 22 from the top by the sixth scan using the sixteenth through twentieth nozzles of the print head 4 and a mask pattern, and the color inks are applied also onto the fourth quarter of the region 22 from the top by the sixth scan using the eleventh through fifteenth nozzles of the print head 4 and a mask pattern. In the color image boundary region 23, the color inks are applied onto the third quarter of the region 23 from the top by the sixth scan using the sixteenth through twentieth nozzles of the print head 4 and a mask pattern, and the color inks are applied also onto the fourth quarter of the region 23 from the top by the sixth scan using the eleventh through fifteenth nozzles of the print head 4 and a mask pattern.

The paper feeding motor 6 then transports the recording paper sheet in the sub scanning direction. In the black image boundary region 21, the black ink is applied onto the fourth quarter of the region 21 from the top by the seventh scan (path 7) using the sixteenth through twentieth nozzles of the print head 4 and a mask pattern. In the color image inner region 22, the color inks are applied onto the fourth quarter of the region 22 from the top by the seventh scan using the sixteenth through twentieth nozzles of the print head 4 and a mask pattern.

In the color image boundary region 23, the color inks are applied onto the fourth quarter of the regions 23 from the top by the seventh scan using the sixteenth through twentieth nozzles of the print head 4 and a mask pattern. In this conventional example, however, ink bleeding is caused by the black ink and the color inks, because the black image boundary region 21 and the color image boundary region 23 are simultaneously formed by the same scans.

In the second embodiment, ink bleeding is prevented by forming an image in the following manner. As shown in FIG. 10C, the black ink is applied onto the top quarter of the black image boundary region 21 by the first scan using the first through fifth nozzles of the print head 4 and a mask pattern. In the color image inner region 22, the color inks are applied onto the top quarter of the region 22 by the first scan using the first through fifth nozzles of the print head 4 and a mask pattern. In the color image boundary region 23, color inks are not applied by the first scan.

The paper feeding motor 6 then transports the recording paper sheet in the sub scanning direction. In the black image inner region 20, the color inks are applied onto the second quarter of the region 20 from the top by the second scan in the opposite direction from the first scan, using the first through fifth nozzles of the print head 4 and a mask pattern. In the black image boundary region 21, the black ink is applied onto the top quarter of the region 21 by the second scan using the sixth through tenth nozzles of the print head 4 and a mask pattern. At the same time, the black ink is applied also onto the second quarter of the region 21 from the top by the second scan using the first through fifth nozzles of the print head 4 and a mask pattern.

In the color image inner region 22, the color inks are applied onto the top quarter of the region 22 by the second scan using the sixth through tenth nozzles of the print head 4 and a mask pattern. At the same time, the color inks are applied also onto the second quarter of the region 22 from the top by the second scan using the first through fifth nozzles of the print head 4 and a mask pattern. In the color image boundary region 23, the color inks are not applied by the second scan.

The paper feeding motor 6 then transports the recording paper sheet in the sub scanning direction. In the black image inner region 20, the color inks are applied onto the second quarter of the region 20 from the top by the third scan in the same direction as the first scan, using the sixth through tenth nozzles of the print head 4 and a mask pattern. At the same time, the color inks are applied onto the third quarter of the region 20 from the top by the third scan using the first through fifth nozzles of the print head 4 and a mask pattern.

In the black image boundary region 21, the black ink is applied onto the second quarter of the region 21 from the top by the third scan using the sixth through tenth nozzles of the print head 4 and a mask pattern. At the same time, the black ink is applied also onto the third quarter of the region 21 from the top by the third scan using the first through fifth nozzles of the print head 4 and a mask pattern.

In the color image inner region 22, the color inks are applied onto the top quarter of the region 22 by the third scan using the eleventh through fifteenth nozzles of the print head 4 and a mask pattern. At the same time, the color inks are applied onto the second quarter of the region 22 from the top by the third scan using the sixth through tenth nozzles of the print head 4 and a mask pattern, and the color inks are applied also onto the third quarter of the region 22 from the top by the third scan using the first through fifth nozzles of the print head 4 and a mask pattern. In the color image boundary region 23, the color inks are applied onto the top quarter of the region 23 by the third scan using the eleventh through fifteenth nozzles of the print head 4 and a mask pattern.

The paper feeding motor 6 then transports the recording paper sheet in the sub scanning direction. In the black image inner region 20, the black ink is applied onto the second quarter of the region 20 from the top by the fourth scan in the opposite direction from the first scan, using the eleventh through fifteenth nozzles of the print head 4 and a mask pattern, and the color inks are applied onto the third quarter of the region 20 from the top by the fourth scan using the sixth through tenth nozzles of the print head 4 and a mask pattern.

In the black image boundary region 21, the black ink is applied onto the third quarter of the region 21 from the top by the fourth scan using the sixth through tenth nozzles of the print head 4 and a mask pattern. In the color image inner region 22, the color inks are applied onto the top quarter of the region 22 by the fourth scan using the sixteenth through twentieth nozzles of the print head 4 and a mask pattern. At the same time, the color inks are applied onto the second quarter of the region 22 from the top by the fourth scan using the eleventh through fifteenth nozzles of the print head 4 and a mask pattern, and the color inks are applied also onto the third quarter of the region 22 from the top by the fourth scan using the sixth through tenth nozzles of the print head 4 and a mask pattern. Further, the color inks are applied onto the fourth quarter of the region 22 from the top by the fourth scan using the first through fifth nozzles of the print head 4 and a mask pattern.

In the color image boundary region 23, the color inks are applied onto the top quarter of the region 23 by the fourth scan using the sixteenth through twentieth nozzles of the print head 4 and a mask pattern, and the color inks are applied also onto the second quarter of the region 23 from the top by the fourth scan using the eleventh through fifteenth nozzles of the print head 4 and a mask pattern.

The paper feeding motor 6 then transports the recording paper sheet in the sub scanning direction. In the black image inner region 20, the black ink is applied onto the second quarter of the region 20 from the top by the fifth scan in the same direction as the first scan, using the sixteenth through twentieth nozzles of the print head 4 and a mask pattern, and the black ink is applied also onto the third quarter of the region 20 from the top by the fifth scan using the eleventh through fifteenth nozzles of the print head 4 and a mask pattern.

In the black image boundary region 21, the black ink is applied onto the fourth quarter of the region 21 from the top by the fifth scan using the sixth through tenth nozzles of the print head 4 and a mask pattern. In the color image inner region 22, the color inks are applied onto the second quarter of the region 22 from the top by the fifth scan using the sixteenth through twentieth nozzles of the print head 4 and a mask pattern. At the same time, the color inks are applied onto the third quarter of the region 22 from the top by the fifth scan using the eleventh through fifteenth nozzles of the print head 4 and a mask pattern, and the color inks are applied also onto the fourth quarter of the region 22 from the top by the fifth scan using the sixth through tenth nozzles of the print head 4 and a mask pattern.

In the color image boundary region 23, the color inks are applied onto the second quarter of the region 23 from the top by the fifth scan using the sixteenth through twentieth nozzles of the print head 4 and a mask pattern, and the color inks are applied also onto the third quarter of the region 23 from the top by the fifth scan using the eleventh through fifteenth nozzles of the print head 4 and a mask pattern.

The paper feeding motor 6 then transports the recording paper sheet in the sub scanning direction. In the black image inner region 20, the black ink is applied onto the third quarter of the region 20 from the top by the sixth scan using the sixteenth through twentieth nozzles of the print head 4 and a mask pattern. In the color image inner region 22, the color inks are applied onto the third quarter of the region 22 from the top by the sixth scan using the sixteenth through twentieth nozzles of the print head 4 and a mask pattern, and the color inks are applied also onto the fourth quarter of the region 22 from the top by the sixth scan using the eleventh through fifteenth nozzles of the print head 4 and a mask pattern.

In the color image boundary region 23, the color inks are applied onto the third quarter of the region 23 from the top by the sixth scan using the sixteenth through twentieth nozzles of the print head 4 and a mask pattern, and the color inks are applied also onto the fourth quarter of the region 23 from the top by the sixth scan using the eleventh through fifteenth nozzles of the print head 4 and a mask pattern.

The paper feeding motor 6 then transports the recording paper sheet in the sub scanning direction. In the color image inner region 22, the color inks are applied onto the fourth quarter of the region 22 from the top by the seventh scan using the sixteenth through twentieth nozzles of the print head 4 and a mask pattern. In the color image boundary region 23, the color inks are applied onto the fourth quarter of the region 23 from the top by the seventh scan using the sixteenth through twentieth nozzles of the print head 4 and a mask pattern.

In accordance with the second embodiment, the color inks are applied in the black image inner region 20 by the second and third scans, before the black ink is applied in the region 20. Accordingly, the drying rate of the black ink is increased.

Also, before the color inks are applied in the color image boundary region 23, the black ink is applied in the black image boundary region 21 by a previous scan. Thus, ink bleeding caused between the black ink and the color inks can be prevented. Also, as is apparent from the comparison with the conventional technique, the same number of scans is required to form each image in the same region. Accordingly, the printing speed does not decrease.

Further, uniform effects can be obtained in the entire printing area of each one page, regardless of the structure of the print head such as a structure with four heads having the same widths for the four colors or a two-head structure having one black head and one collective head of the other three colors, the arrangement of the black head and the color heads, and the printing style such as bi-directional printing or one-directional printing. Also, by the conventional method, there is a difference in color tone between a region in which the black ink is first applied and a region in which the color inks are first applied in the black image inner region 20. In this embodiment, however, there is little difference in color tone between swaths (band-like printed regions), as the black ink and the color inks are always applied in the same order in the black image inner region 20.

It should be understood that the second embodiment is merely an example and various changes may be made to the method of applying the color inks as a base in the black image inner region 20, the black pixel thinning technique and thinning rate, and the interval between the former ink application and the latter ink application.

Third Embodiment

Next, a third embodiment of the present invention is described. In the third embodiment, color inks having a higher permeability than the black ink is employed, and ink bleeding is reduced and the drying rate (the fixability) is increased by causing a chemical reaction between the black ink and the color inks. Here, the color inks should be reactive with the black ink. In the third embodiment, a 2-path recording method is employed to form each recording image region by two scans with the print head, as in the first embodiment.

FIG. 11 shows a table that is used to determine the printing order in the third embodiment. In FIG. 11, each value of the input pixel data represents a data value. The input pixel data are made up of black pixels in the black image inner region 20 and the black image boundary region 21, and are made up of color pixels in the color image inner region 22 and the color image boundary region 23. Receiving the input pixel data from the recording data storing unit 204, the multi-path print data generating unit 206 refers to the table shown in FIG. 11, and determines whether the pixels should be printed in the former path or the latter path as described later.

In the black image inner region 20, the color pixels are printed in the former scan ('11'), and the black pixels are printed in the latter scan ('11'). In the black image boundary region 21, the color pixels are printed in the former scan ('11'), and the black pixels are printed in the latter scan ('11'). In the color image inner region 22 and the color image boundary region 23, print control based on the additional information is not performed. In the third embodiment, the control operation of printing black pixels first and color pixels later is not performed.

Such inks are employed that a chemical reaction occurs between the black ink and the color inks in the third embodiment. Accordingly, the drying rate (the fixability) of the black ink can be increased by applying the color inks before applying the black ink in the black image inner region 20 and the regions in which the black ink is adjacent to the color inks. After determining the printing order in each region, the multi-path print data generating unit 206 sets the print rates of the print head 4.

Figure 12:
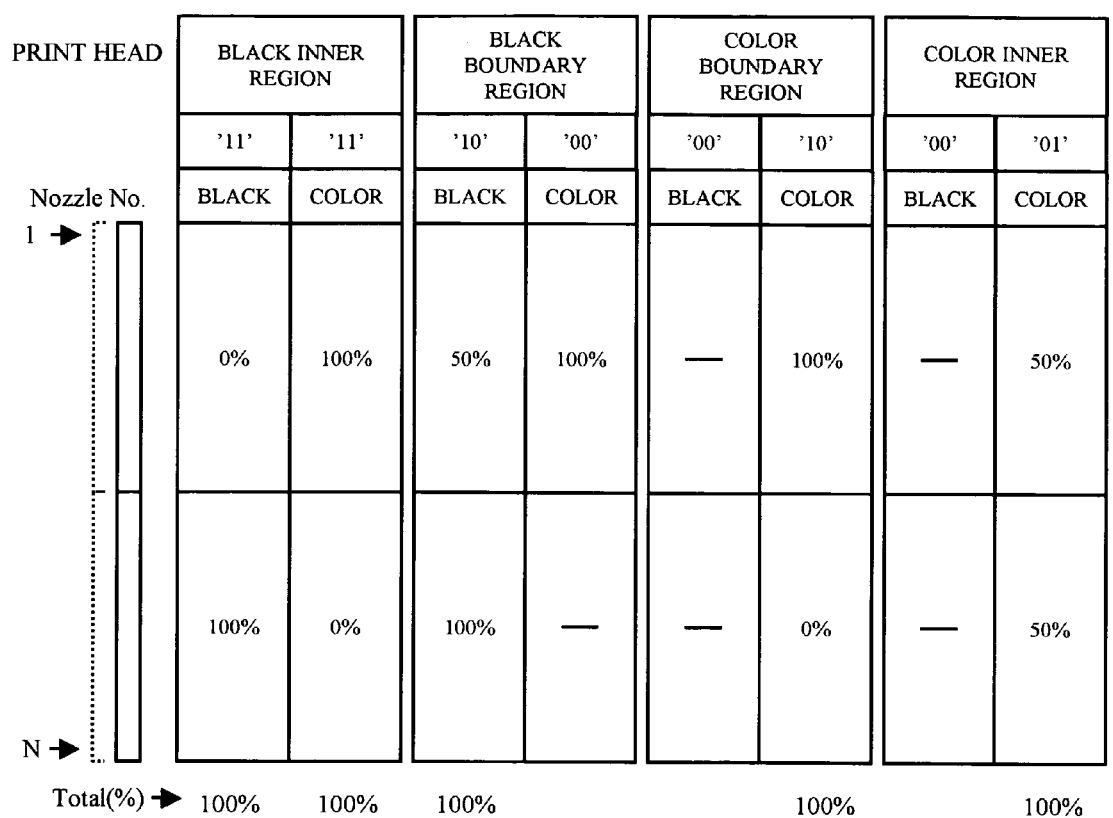
FIG. 12 shows examples of print rates set for the print head in a multi-path printing operation in accordance with the third embodiment.

FIG. 12 shows examples of the print rates of the print head 4 in a multi-path printing operation. In the example shown in FIG. 12, the print head 4 includes N nozzles (1 through N).

The multi-path print data generating unit 206 sets the print rates of the print head 4 so that the first through N/2th nozzles of the print head 4 are used in the first scan to apply ink onto a half of the region, and the ((N/2)+1) th through Nth nozzles of the print head 4 are used in the second scan to apply ink onto the same region.

In the black image inner region 20, the print rate of the print head 4 is set so that the color inks are applied by the first scan using the first through N/2th nozzles of the print head 4, and the black ink is applied by the second scan using the ((N/2)+1)th through Nth nozzles of the print head 4. In the black image boundary region 21, the print rate of the print head 4 is set so that the color inks are applied by the first scan using the first through N/2th nozzles of the print head 4, and the black ink is applied by the second scan using the ((N/2)+1)th through Nth nozzles of the print head 4.

In the color image boundary region 23, the print rate of the print head 4 is set so that the color inks are applied by the first scan-using the first through N/2th nozzles of the print head 4. In the color image inner region 22, the print rate of the print head 4 is set so that the color inks are applied to the region 22 thinned to ½ by the first scan using the first through N/2th nozzles of the print head 4, and the color inks are applied by the second scan using the ((N/2)+1)th through Nth nozzles of the print head 4.

Figure 13:
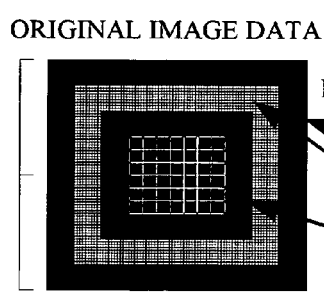
FIGS. 13A through 13C illustrate a recording operation based on the multi-path printing data in accordance with the third embodiment.
Figure 13B:
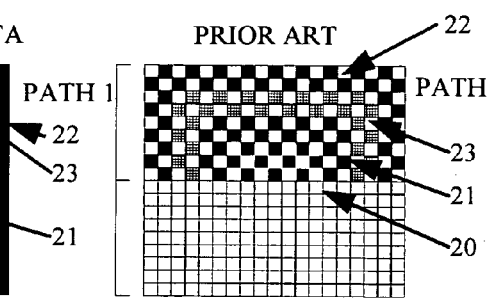
Figure 13B:
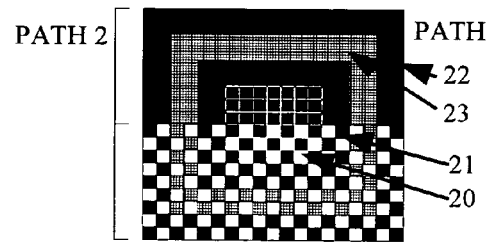
Figure 13B:
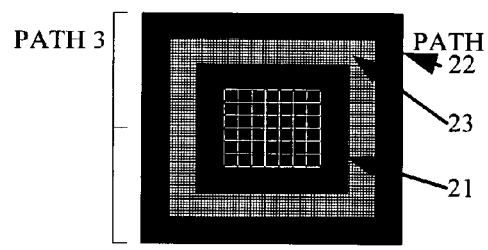
Figure 13C:
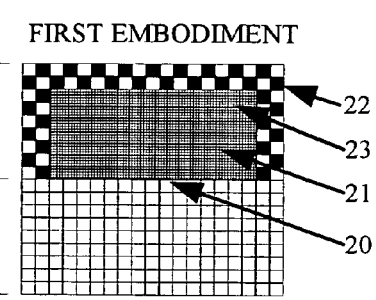
Figure 13C:
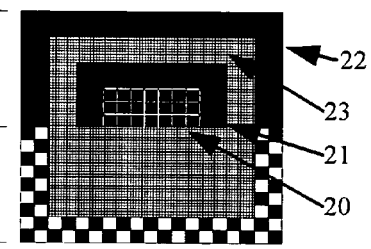
Figure 13C:
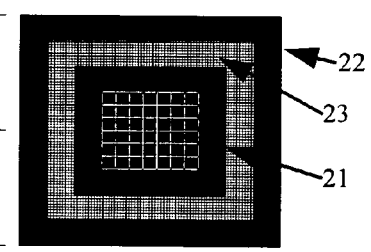

Next, a recording operation based on the multi-path print data is described. FIGS. 13A through 13C illustrate the recording operation based on the multi-path print data in the third embodiment. FIG. 13A shows original image data, FIG. 13B shows an image forming process by a conventional 2-path printing technique, and FIG. 13C shows an image forming process in accordance with the third embodiment.

In each of FIGS. 13A through 13C, reference numeral 20 indicates a black image inner region, reference numeral 21 indicates a black image boundary region, reference numeral 22 indicates a color image inner region, and reference numeral 23 indicates a color image boundary region. FIG. 13B illustrates the same conventional image forming process as FIG. 7B, and therefore, explanation of it is omitted herein.

In the third embodiment, the color inks are applied onto the upper half of each of the black image inner region 20 and the black image boundary region 21 by the first scan using the first through ninth nozzles of the print head 4, as shown in FIG. 13C. In the color image boundary region 23, the color inks are applied onto the upper half of the region 23 by the first scan using the first through ninth nozzles of the print head 4. In the color image inner region 22, the color inks are applied onto the upper half of the region 22 by the first scan using the first through ninth nozzles of the print head 4 and a mask pattern.

The paper feeding motor 6 then transports the recording paper in the sub scanning direction. The black ink is then applied onto the upper half of each of the black image inner region 20 and the black image boundary region 21 by the second scan in the opposite direction from the first scan, using the tenth through eighteenth nozzles of the print head 4. At the same time, the color inks are applied onto the lower half of each of the regions 20 and 21, using the first through ninth nozzles of the print head 4.

In the color image inner region 22, the color inks are applied onto the upper half of the region 22 by the second scan using the tenth through eighteenth nozzles of the print head 4 and a mask pattern. At the same time, the color inks are applied to the lower half of the region 22, using the first through ninth nozzles of the print head 4 and a mask pattern. In the color image boundary region 23, the color inks are applied onto the lower half of the region 23 by the second scan using the first through ninth nozzles of the print head 4.

The paper feeding motor 6 then transports the recording paper in the sub scanning direction. The black ink is then applied onto the lower half of each of the black image inner region 20 and the black image boundary region 21 by the third scan in the same direction as the first scan, using the tenth through eighteenth nozzles of the print head 4. In the color image inner region 22, the color inks are applied onto the lower half of the region 22 by the third scan using the tenth through eighteenth nozzles of the print head 4 and a mask pattern, thereby completing the image.

In accordance with the third embodiment, inks are selected so that a chemical reaction occurs between the black ink and the color inks. Accordingly, ink bleeding is reduced and the drying rate (the fixability) of the black ink is increased by applying the color inks before applying the black ink in the black image inner region 20 and the regions in which the black ink is adjacent to the color inks.

Fourth Embodiment

Next, a fourth embodiment of the present invention is described. The fourth embodiment differs from the first embodiment only in its operation, and therefore, has the same structure as the color ink jet recording apparatus 1 of the first embodiment. In the fourth embodiment, color inks having a higher permeability than the black ink are employed. Also, ink bleeding is reduced and the drying rate (the fixability) is increased by causing a chemical reaction between the black ink and the color inks, as in the third embodiment. In the fourth embodiment, a 4-path recording method is employed to form each recording image region by four scans with the print head 4.

FIG. 14 shows a table that is used to determine the printing order in the fourth embodiment. Receiving the input pixel data from the recording data storing unit 204, the multi-path print data generating unit 206 refers to the table shown in FIG. 14, and determines whether the pixels should be printed in the former path or the latter path as described later.

In the black image inner region 20, the color pixels are printed by the former scan ('11'), and the black pixels are printed by the latter scan ('11'). In the black image boundary region 21, the color pixels are printed by the former scan ('11'), and the black pixels are printed by the latter scan ('11'). In the color image inner region 22, print control based on the additional information is not performed. In the color image boundary region 23, the color pixels are printed by the latter scan ('10').

Such inks are employed that a chemical reaction occurs between the black ink and the color inks in the third embodiment. The color inks are applied before the black ink in the black image inner region 20 and the regions in which the black ink is adjacent to the color inks, so that ink bleeding can be prevented by reactive solidification.

Figure 15:
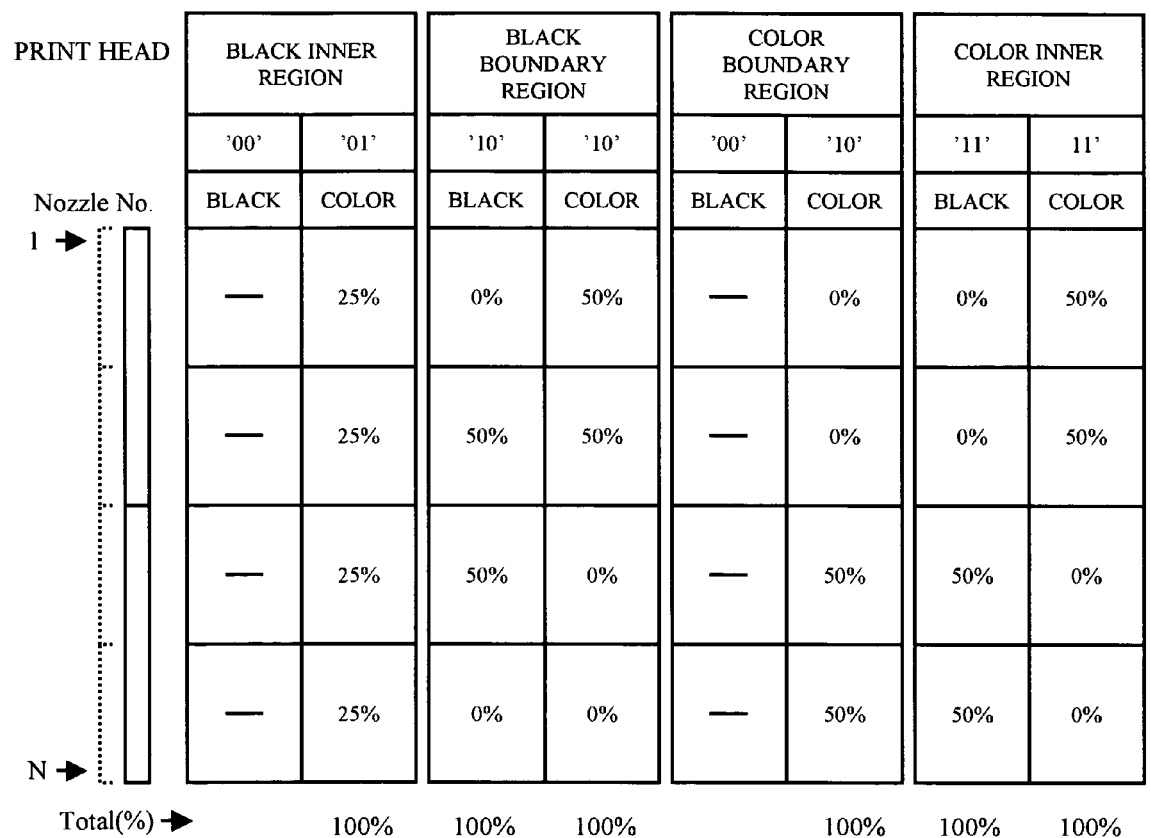
FIG. 15 shows examples of print rates set for the print head in a multi-path printing operation in accordance with the fourth embodiment.

After determining the printing order for each region, the multi-path print data generating unit 206 sets the print rates of the print head 4. FIG. 15 shows examples of the print rates of the print head 4 in a multi-path printing operation.

The multi-path print data generating unit 206 sets the print rates of the print head 4 so that the first through N/4th nozzles of the print head 4 are used in the first scan to apply ink onto a quarter of the region, the ((N/4)+1)th through N/2th nozzles of the print head 4 are used in the second scan to apply ink onto the same region, the ((N/2)+1)th through N×¾th nozzles of the print head 4 are used in the third scan to apply ink onto the same region, and the ((N×¾)+1)th through Nth nozzles of the print head 4 are used in the fourth scan to apply ink onto the same region.

In the color image inner region 22, the print rate of the print head 4 is set so that the color inks are applied by the first scan using the first through N/4th nozzles of the print head 4 in a quarter of the region 22 thinned to 25%, the color inks are applied by the second scan using the ((N/4)+1)th through N/2th nozzles of the print head 4 in the same region thinned to 25%, the color inks are applied by the third scan using the ((N/2)+1)th through N×¾th nozzles of the print head 4 in the same region thinned to 25%, and the color inks are applied by the fourth scan using the ((N×¾)+1)th through Nth nozzles of the print head 4 in the same region thinned to 25%.

In the black image boundary region 21, the print rate of the print head 4 is set so that the color inks are applied by the first scan using the first through N/4th nozzles of the print head 4 in a quarter of the region 21 thinned to 50%, the color inks are applied by the second scan using the ((N/4)+1)th through N/2th nozzles of the print head 4 in the same region thinned to 50%, the black ink is applied also by the second scan using the ((N/4)+1)th through N/2th nozzles of the print head 4 in the same region thinned to 50%, and the black ink is applied by the third scan using the ((N/2)+1)th through N ×¾th nozzles of the print head 4 in the same region thinned to 50%.

In the color image boundary region 23, the print rate of the print head 4 is set so that the color inks are not applied by the first and second scans, the color inks are applied by the third scan using the ((N/2)+1)th through N×¾th nozzles of the print head 4 in a quarter of the region 23 thinned to 50%, and the color inks are applied by the fourth scan using the ((N×¾)+1)th through Nth nozzles of the print head 4 in the same region thinned to 50%.

In the black image inner region 20, the print rate of the print head 4 is set so that the color inks are applied by the first scan using the first through N/4th nozzles of the print head 4 in a quarter of the region 20 thinned to 50%, the color inks are applied by the second scan using the ((N/4)+1)th through N/2th nozzles of the print head 4 in the same region thinned to 50%, the black ink is applied by the third scan using the ((N/2)+1)th through N×¾th nozzles of the print head 4 in the same region thinned to 50%, and the black ink is applied by the fourth scan using the ((N×¾)+1)th through Nth nozzles of the print head 4 in the same region thinned to 50%.

Figure 16A:
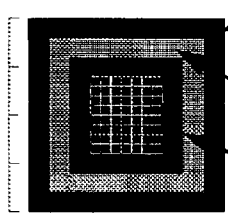
FIGS. 16A through 16C illustrate a recording operation based on the multi-path print data in accordance with the fourth embodiment.
Figure 16B:
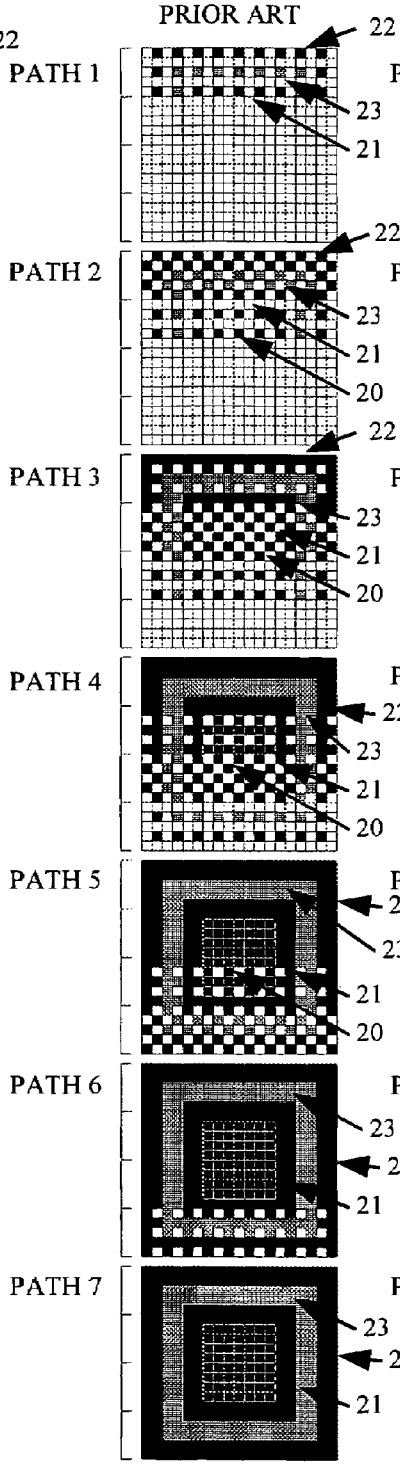
Figure 16C:
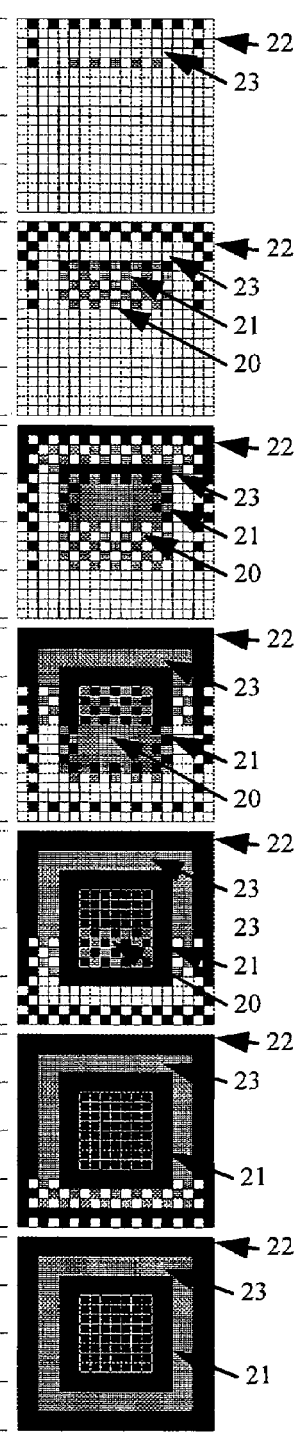

Next, a recording operation based on the multi-path print data is described. FIGS. 16A through 16C illustrate the recording operation based on the multi-path print data in the fourth embodiment. FIG. 16A shows original image data, FIG. 16B shows an image forming process by a conventional 4-path printing technique, and FIG. 16C shows an image forming process in accordance with the fourth embodiment. In the examples shown in FIGS. 16A through 16C, the number of nozzles of the print head 4 is 20. Accordingly, N in FIG. 15 is 20.

In each of FIGS. 16A through 16C, reference numeral 20 indicates a black image inner region, reference numeral 21 indicates a black image boundary region, reference numeral 22 indicates a color image inner region, and reference numeral 23 indicates a color image boundary region. The image forming process illustrated in FIG. 16B is the same as the image forming process illustrated in FIG. 10B, and therefore, explanation of it is omitted herein. In the fourth embodiment, the black ink is applied onto the top quarter of the black image boundary region 21 by the first scan using the first through fifth nozzles of the print head 4 and a mask pattern, as shown in FIG. 16C.

In the color image inner region 22, the color inks are applied onto the top quarter of the region 22 by the first scan using the first through fifth nozzles of the print head 4 and a mask pattern. In the color image boundary region 23, color inks are not applied by the first scan.

The paper feeding motor 6 then transports the recording paper sheet in the sub scanning direction. In the black image inner region 20, the color inks are applied onto the second quarter of the region 20 from the top by the second scan in the opposite direction from the first scan, using the first through fifth nozzles of the print head 4 and a mask pattern. In the black image boundary region 21, the black ink is applied onto the top quarter of the region 21 by the second scan using the sixth through tenth nozzles of the print head 4 and a mask pattern. At the same time, the color inks are applied also onto the second quarter of the region 21 from the top by the second scan using the first through fifth nozzles of the print head 4 and a mask pattern.

In the color image inner region 22, the color inks are applied onto the top quarter of the region 22 by the second scan using the sixth through tenth nozzles of the print head 4 and a mask pattern. At the same time, the color inks are applied also onto the second quarter of the region 22 from the top by the second scan using the first through fifth nozzles of the print head 4 and a mask pattern. In the color image boundary region 23, the color inks are not applied by the second scan.

The paper feeding motor 6 then transports the recording paper sheet in the sub scanning direction. In the black image inner region 20, the color inks are applied onto the second quarter of the region 20 from the top by the third scan in the same direction as the first scan, using the sixth through tenth nozzles of the print head 4 and a mask pattern. At the same time, the color inks are applied onto the third quarter of the region 20 from the top by the third scan using the first through fifth nozzles of the print head 4 and a mask pattern.

In the black image boundary region 21, the black ink is applied onto the top quarter of the region 21 by the third scan using the eleventh through fifteenth nozzles of the print head 4 and a mask pattern, and the black ink is applied also onto the second quarter of the region 21 from the top by the third scan using the sixth through tenth nozzles of the print head 4 and a mask pattern.

In the color image inner region 22, the color inks are applied onto the top quarter of the region 22 by the third scan using the eleventh through fifteenth nozzles of the print head 4 and a mask pattern. At the same time, the color inks are applied onto the second quarter of the region 22 from the top by the third scan using the sixth through tenth nozzles of the print head 4 and a mask pattern, and the color inks are applied also onto the third quarter of the region 22 from the top by the third scan using the first through fifth nozzles of the print head 4 and a mask pattern. In the color image boundary region 23, the color inks are applied onto the top quarter of the region 23 by the third scan using the eleventh through fifteenth nozzles of the print head 4 and a mask pattern.

The paper feeding motor 6 then transports the recording paper sheet in the sub scanning direction. In the black image inner region 20, the black ink is applied onto the second quarter of the region 20 from the top by the fourth scan in the opposite direction from the first scan, using the eleventh through fifteenth nozzles of the print head 4 and a mask pattern, and the color inks are applied onto the third quarter of the region 20 from the top by the fourth scan using the sixth through tenth nozzles of the print head 4 and a mask pattern.

In the black image boundary region 21, the black ink is applied onto the third quarter of the region 21 from the top by the fourth scan using the eleventh through fifteenth nozzles of the print head 4 and a mask pattern, and the black ink is applied onto the second quarter of the region 21 from the top by the fourth scan using the sixth through tenth nozzles of the print head 4 and a mask pattern.

In the color image inner region 22, the color inks are applied onto the top quarter of the region 22 by the fourth scan using the sixteenth through twentieth nozzles of the print head 4 and a mask pattern. At the same time, the color inks are applied onto the second quarter of the region 22 from the top by the fourth scan using the eleventh through fifteenth nozzles of the print head 4 and a mask pattern, and the color inks are applied also onto the third quarter of the region 22 from the top by the fourth scan using the sixth through tenth nozzles of the print head 4 and a mask pattern. Further, the color inks are applied onto the fourth quarter of the region 22 from the top by the fourth scan using the first through fifth nozzles of the print head 4 and a mask pattern.

In the color image boundary region 23, the color inks are applied onto the top quarter of the region 23 by the fourth scan using the sixteenth through twentieth nozzles of the print head 4 and a mask pattern, and the color inks are applied also onto the second quarter of the region 23 from the top by the fourth scan using the eleventh through fifteenth nozzles of the print head 4 and a mask pattern.

The paper feeding motor 6 then transports the recording paper sheet in the sub scanning direction. In the black image inner region 20, the black ink is applied onto the second quarter of the region 20 from the top by the fifth scan in the same direction as the first scan, using the sixteenth through twentieth nozzles of the print head 4 and a mask pattern, and the black ink is applied also onto the third quarter of the region 20 from the top by the fifth scan using the eleventh through fifteenth nozzles of the print head 4 and a mask pattern.

In the black image boundary region 21, the black ink is applied onto the third quarter of the region 21 from the top by the fifth scan using the eleventh through fifteenth nozzles of the print head 4 and a mask pattern, and the black ink is applied also onto the fourth quarter of the region 21 from the top by the fifth scan using the sixth through tenth nozzles of the print head 4 and a mask pattern.

In the color image inner region 22, the color inks are applied onto the second quarter of the region 22 from the top by the fifth scan using the sixteenth through twentieth nozzles of the print head 4 and a mask pattern. At the same time, the color inks are applied onto the third quarter of the region 22 from the top by the fifth scan using the eleventh through fifteenth nozzles of the print head 4 and a mask pattern, and the color inks are applied also onto the fourth quarter of the region 22 from the top by the fifth scan using the sixth through tenth nozzles of the print head 4 and a mask pattern.

In the color image boundary region 23, the color inks are applied onto the second quarter of the region 23 from the top by the fifth scan using the sixteenth through twentieth nozzles of the print head 4 and a mask pattern, and the color inks are applied also onto the third quarter of the region 23 from the top by the fifth scan using the eleventh through fifteenth nozzles of the print head 4 and a mask pattern.

The paper feeding motor 6 then transports the recording paper sheet in the sub scanning direction. In the black image inner region 20, the black ink is applied onto the third quarter of the region 20 from the top by the sixth scan using the sixteenth through twentieth nozzles of the print head 4 and a mask pattern. In the black image boundary region 21, the black ink is applied onto the fourth quarter of the region 21 from the top by the sixth scan using the eleventh through fifteenth nozzles of the print head 4 and a mask pattern.

In the color image inner region 22, the color inks are applied onto the third quarter of the region 22 from the top by the sixth scan using the sixteenth through twentieth nozzles of the print head 4 and a mask pattern, and the color inks are applied also onto the fourth quarter of the region 22 from the top by the sixth scan using the eleventh through fifteenth nozzles of the print head 4 and a mask pattern.

In the color image boundary region 23, the color inks are applied onto the third quarter of the region 23 from the top by the sixth scan using the sixteenth through twentieth nozzles of the print head 4 and a mask pattern, and the color inks are applied also onto the fourth quarter of the region 23 from the top by the sixth scan using the eleventh through fifteenth nozzles of the print head 4 and a mask pattern.

The paper feeding motor 6 then transports the recording paper sheet in the sub scanning direction. In the color image inner region 22, the color inks are applied onto the fourth quarter of the region 22 from the top by the seventh scan using the sixteenth through twentieth nozzles of the print head 4 and a mask pattern. In the color image boundary region 23, the color inks are applied onto the fourth quarter of the region 23 from the top by the seventh scan using the sixteenth through twentieth nozzles of the print head 4 and a mask pattern.

In accordance with the fourth embodiment, reactive inks are employed, and the color inks are applied in the black image inner region 20 and the black image boundary region 21 before the black ink is applied in these regions 20 and 21. Accordingly, the fixability of the black ink is increased. Also, ink bleeding is reduced in the black image boundary region 21 and the color image boundary region 23, and the drying rate (the fixability) of the black ink in the black image inner region 20 is increased.

The ink bleeding preventing effect is achieved with the reactive inks in the color image boundary region 23. Also, ink bleeding between the black image boundary region 21 and the color image boundary region 23 can be reduced by setting a time interval between the black printing and the color printing.

Also, as described above, more complicated multi-path print data generating rules can be applied to a 4-path printing operation than in a 2-path printing operation. Accordingly, improvements that could not be achieved by the prior art can be achieved. As in the first through third embodiment, a pixel converting process has not been described, but the fourth embodiment may be combined with a pixel converting process.

As described so far, information is added after determining the boundary between print images, and print control is performed based on the added information. Accordingly, ink bleeding can be reduced and the drying rate can be increased in the black image boundary region 21 and the color image boundary region 23, without a decrease in printing speed. In a case where paper sheets that are less resistant to ink bleeding and have a lower drying rate are used, a pixel converting process may be combined with any of the above described embodiments, so as to optimize the effects of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-320591 filed on Sep. 12, 2003 including specification, claims, drawings and abstract is incorporated herein by reference in its entirety.

What is claimed is:

1. An ink jet recording apparatus comprising:
a black print head that discharges black ink;
a color print head that discharges color ink having a higher permeability with a recording paper sheet than the black ink; and
a determining unit that detects, based on input data, a black image region in which recording is performed with the black ink and a color image region in which recording is performed with the color ink, and, based on the detection result, determines whether the black ink or the color ink is first applied onto the recording paper sheet,
wherein each of the black print head and the color print head having nozzles divided into a plurality of sets, and a multi-path recording operation being performed by scanning each recording region a plurality of times with the plurality of sets of nozzles, and
wherein the black ink and the color ink are not applied in adjacent regions in the same recording scan, the black ink being applied first in regions in which the black ink region and the color ink region are adjacent to each other.

2. The ink jet recording apparatus as claimed in claim 1, further comprising
a region detecting unit that detects the black image region, the color image region, a black image boundary region that is located in a predetermined area in the black image region, and a color image boundary region that is located in a predetermined area in the color image region, based on the image data.

3. The ink jet recording apparatus as claimed in claim 2, wherein the determining unit generates such print data that a scan to perform recording in the color image boundary region is performed after a scan to perform recording in the black image boundary region.

4. The ink jet recording apparatus as claimed in claim 1, further comprising
a pixel converting unit that converts pixels in the black image region or the color image region into predetermined pixels, in accordance with predetermined pixel converting rules.

5. The ink jet recording apparatus as claimed in claim 4, wherein the pixel converting unit adds pixels in such a manner that recording with the color ink is performed on spots to be recorded with the black ink in the black image region, before recording with the black ink is performed in the black image region.

6. The ink jet recording apparatus as claimed in claim 5, wherein the determining unit generates such printing data that a scan to apply the color ink onto spots to be recorded with the black ink in the black image region is performed before a scan to apply the black ink in the black image region.

7. The ink jet recording apparatus as claimed in claim 1, further comprising
a mask pattern generating unit that generates a mask pattern to be used in each scan, in accordance with the number of scans to be performed with each of the print heads.

8. The ink jet recording apparatus as claimed in claim 7, wherein the determining unit uses the mask pattern generated by the mask pattern generating unit for the black image region and/or the color image region.

9. The ink jet recording apparatus as claimed in claim 1, wherein the color ink is reactive with the black ink.

10. The ink jet recording apparatus as claimed in claim 1, wherein the number of scans in the multi-path recording operation is an even number.

11. The ink jet recording apparatus as claimed in claim 1, wherein the number of sets of nozzles is equal to the number obtained by dividing the number of nozzles by the number of scans.

12. An ink jet recording method for performing a multi-path recording operation with a black print head that discharges black ink and a color print head that discharges color ink having a higher permeability with a recording paper sheet than the black ink, each of the print heads having nozzles being divided into a plurality of sets, and the multi-path recording operation being performed by scanning each recording region a plurality of times with the plurality of sets of nozzles, the method comprising:
detecting, based on input data, a black image region in which recording is performed with the black ink and a color image region in which recording is performed with the color ink;
determining, based on the detection result, whether the black ink or the color ink is first used to perform recording on the recording paper sheet; and
applying the black ink and the color ink such that the black ink and color ink are not applied in adjacent regions in the same recording scan, the black ink being applied first in regions in which the black ink region and the color ink region are adjacent to each other.

13. The ink jet recording method as claimed in claim 12, further comprising the step of detecting, based on the input data, the black image region, the color image region, a black image boundary region that is located in a predetermined area in the black image region, and a color image boundary region that is located in a predetermined area in the color image boundary region.

14. The ink jet recording method as claimed in claim 13, further comprising the step of performing recording in the color image boundary region by an earlier scan than a scan to perform recording in the black image boundary region.

15. The ink jet recording method as claimed in claim 12, further comprising the step of converting pixels in the black image region or the color image region into predetermined pixels, in accordance with predetermined pixel converting rules.

16. The ink jet recording method as claimed in claim 12, further comprising the step of performing recording with the color ink on spots to be printed with the black ink before performing recording with the black ink in the black image region.

17. The ink jet recording method as claimed in claim 16, wherein the step of performing the recording with the color ink is carried out by an earlier scan than a scan to perform the recording with the black ink in the black image region.

18. The ink jet recording method as claimed in claim 12, further comprising the step of generating a mask pattern to be used in each scan, in accordance with the number of scans to be performed with each of the print heads.

19. The ink jet recording method as claimed in claim 12, wherein the color ink is reactive with the black ink.

* * * * *